US012215303B2

(12) United States Patent
Hong et al.

(10) Patent No.: US 12,215,303 B2
(45) Date of Patent: Feb. 4, 2025

(54) BEVERAGE MAKER AND CONTROL METHOD OF THE SAME

(71) Applicant: LG Electronics Inc., Seoul (KR)

(72) Inventors: Jinpyo Hong, Seoul (KR); Yongbum Kim, Seoul (KR); Youngjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 892 days.

(21) Appl. No.: 17/313,521

(22) Filed: May 6, 2021

(65) Prior Publication Data

US 2021/0348091 A1 Nov. 11, 2021

(30) Foreign Application Priority Data

May 8, 2020 (KR) .......................... 10-2020-0055422

(51) Int. Cl.
*C12C 11/00* (2006.01)
*C12C 11/06* (2006.01)
*C12C 13/10* (2006.01)

(52) U.S. Cl.
CPC ............ *C12C 11/006* (2013.01); *C12C 11/06* (2013.01); *C12C 13/10* (2013.01)

(58) Field of Classification Search
CPC ........ C12C 11/006; C12C 11/06; C12C 13/10
See application file for complete search history.

(56) References Cited

U.S. PATENT DOCUMENTS

2017/0335256 A1* 11/2017 Park .................. C12C 11/006
2018/0016531 A1* 1/2018 Park .................... C12C 13/10

FOREIGN PATENT DOCUMENTS

KR    20110005306    1/2011
KR    20190029300    3/2019

OTHER PUBLICATIONS

Korean Office Action in Korean Appln. No. 10-2020-0055422, dated Apr. 29, 2021, 9 pages (with English translation).

* cited by examiner

*Primary Examiner* — Joe E Mills, Jr.
(74) *Attorney, Agent, or Firm* — Fish & Richardson P.C.

(57) ABSTRACT

A beverage maker includes a fermentation module, a gas discharge channel connected to the fermentation module, a gas discharge valve connected to the gas discharge channel, a storage tank connected to the gas discharge value and provided with a space capable of accommodating gas therein, an actuator configured to inject gas collected in the space of the storage tank to the fermentation module through the gas discharge channel, a gas pressure sensor connected before the gas discharge valve in a gas flow direction in the gas discharge channel, and a controller configured to control the gas discharge valve and the actuator based on a pressure value of the gas pressure sensor.

14 Claims, 8 Drawing Sheets

BEVERAGE MAKER AND CONTROL METHOD OF THE SAME

CROSS-REFERENCE TO RELATED APPLICATIONS

The present application claims priority under 35 U.S.C. 119 and 35 U.S.C. 365 to Korean Patent Application No. 10-2020-0055422, filed on May 8, 2020, which is hereby incorporated by reference in its entirety.

BACKGROUND

The present disclosure relates to a beverage maker and, more particularly, to a beverage maker for making fermented beverages and a method of operating the same Beverages are collectively referred to as drinkable liquids such as alcohol or tea. For example, beverages may be divided into various categories such as water (a beverage) to solve thirst, juice beverages with unique flavor and taste, refreshing beverages giving refreshing sensation, or alcoholic beverages with an alcohol effect.

A representative example of an alcoholic beverage may be a beer. The beer is an alcoholic beverage made by making juice of malt sprouting from barley, filtering the juice, adding hop, and fermenting the juice by using the yeast.

Consumers may purchase ready-made products made and sold by a beer maker or home beer (or handmade beer) made by directly fermenting beer ingredients at home or in a bar.

House beer may be made in a variety of types rather ready-made products and may be made to suit the consumer's taste.

The ingredients for making beer may include water, malt, hop, yeast, flavoring additives, and the like.

The yeast, which is called leaven, may be added to malt to ferment the malt and help to produce alcohol and carbonic acid.

The flavor additives are additives that enhance the taste of beer such as fruit and the like.

The house beer may be made through three stages, namely, a wort production stage, a fermentation stage, and an aging stage, and it may take about two to three weeks from the wort production step to the aging stage.

It is important for the house beer to maintain an optimum temperature during the fermentation stage, and the more the beer is more simply made, the more user's convenience is improved.

In recent years, beverage makers that can easily make house beer at home or at a bar are gradually being used. The fermented beverages such as the beer may be fermented by a beverage maker. The beverage maker may safely and simply make beverages.

SUMMARY

An object of the present disclosure is to shorten a beverage making period by collecting gas using a storage tank and reusing the gas in a beverage making process without discharging gas generated in a fermentation module when making beverage.

An object of the present disclosure is to make beverage without a separate gas filling apparatus by reusing fermentation gas generated in a beverage making process.

A beverage maker according to an embodiment of the present disclosure includes a fermentation module, a gas discharge channel connected to the fermentation module, a gas discharge valve connected to the gas discharge channel, a storage tank connected to the gas discharge value and provided with a space capable of accommodating gas therein, an actuator configured to inject gas collected in the space of the storage tank to the fermentation module through the gas discharge channel, a gas pressure sensor connected before the gas discharge valve in a gas flow direction in the gas discharge channel, and a controller configured to control the gas discharge valve and the actuator based on a pressure value of the gas pressure sensor.

The controller may be configured to open the gas discharge valve such that gas generated in the fermentation module is accommodated in the storage tank along the gas discharge channel, during a fermentation step.

The controller according to one embodiment of the present disclosure may be configured to close the gas discharge valve after opening the gas discharge valve for an open set time, to close the gas discharge valve during a closing set time, and to determine whether the fermentation step has ended when change in pressure value detected by the pressure sensor is less than first set pressure during the closing set time.

The controller according to another embodiment of the present disclosure may be configured to open the gas discharge valve when a pressure value obtained by the pressure sensor exceeds second set pressure, to close the gas discharge valve when the pressure value obtained by the pressure sensor is equal to or less than the second set pressure, and to determine that the fermentation step has ended when the number of times of opening the gas discharge valve is less than a set number during a set time.

The controller according to another embodiment of the present disclosure may be configured to open the gas discharge valve and to determine that the fermentation step has ended when a pressure value obtained by the pressure sensor exceeds third set pressure.

The controller may be configured to operate the actuator to move gas accommodated in the storage tank to the fermentation module through the gas discharge channel, when a fermentation step has ended.

According to an embodiment of the present disclosure, the beverage maker may further include a partition wall disposed inside the storage tank to partition the storage tank.

In addition, the beverage maker may further include a gas release valve configured to discharge gas accommodated in the space of the storage tank to an outside.

A method of operating a beverage maker according to an embodiment of the present disclosure may include a fermentation step of detecting pressure by a pressure sensor provided in a gas discharge channel, through which gas of a fermentation module is discharged, and opening or closing a gas discharge valve connected to the gas discharge channel based on the pressure detected by the pressure sensor, a gas collection step of collecting gas using a storage tank connected to the gas discharge valve and provided with a space capable of accommodating gas therein when the gas discharge valve is opened, during the fermentation step, and a gas filling step of transmitting gas collected using an actuator connected to the storage tank to the fermentation module in a gas collection direction, when the fermentation step has ended.

The gas collection step according to an embodiment of the present disclosure may include closing the gas discharge valve after opening the gas discharge valve for an open set time and closing the gas discharge valve during a closing set time and determining that the fermentation step has ended when change in pressure value detected by the pressure sensor during the closing set time is less than first set pressure.

The gas collection step according to another embodiment of the present disclosure may include opening the gas discharge valve when a pressure value obtained by the pressure sensor exceeds second set pressure and closing the gas discharge valve when the pressure value obtained by the pressure sensor is equal to or less than the second set pressure, and determining that the fermentation step has ended when the number of times of opening the gas discharge valve during a set time is less than a set number.

The gas collecting step according to another embodiment of the present disclosure may include opening the gas discharge valve and determining that the fermentation step has ended when a pressure value obtained by the pressure sensor exceeds third set pressure.

The method may further include a gas release valve discharging gas accommodated in the space to an outside after the gas filling step.

DETAILED DESCRIPTION OF THE EMBODIMENTS

Hereinafter, detailed embodiments of the present disclosure will be described in detail with reference to the accompanying drawings.

Although beer is exemplified as a beverage made by using a beverage maker in this specification, a kind of beverages is not limited to the beer that is capable of being made by using the beverage maker. For example, various kinds of beverages may be made through the beverage maker according to embodiments.

Figure 1:
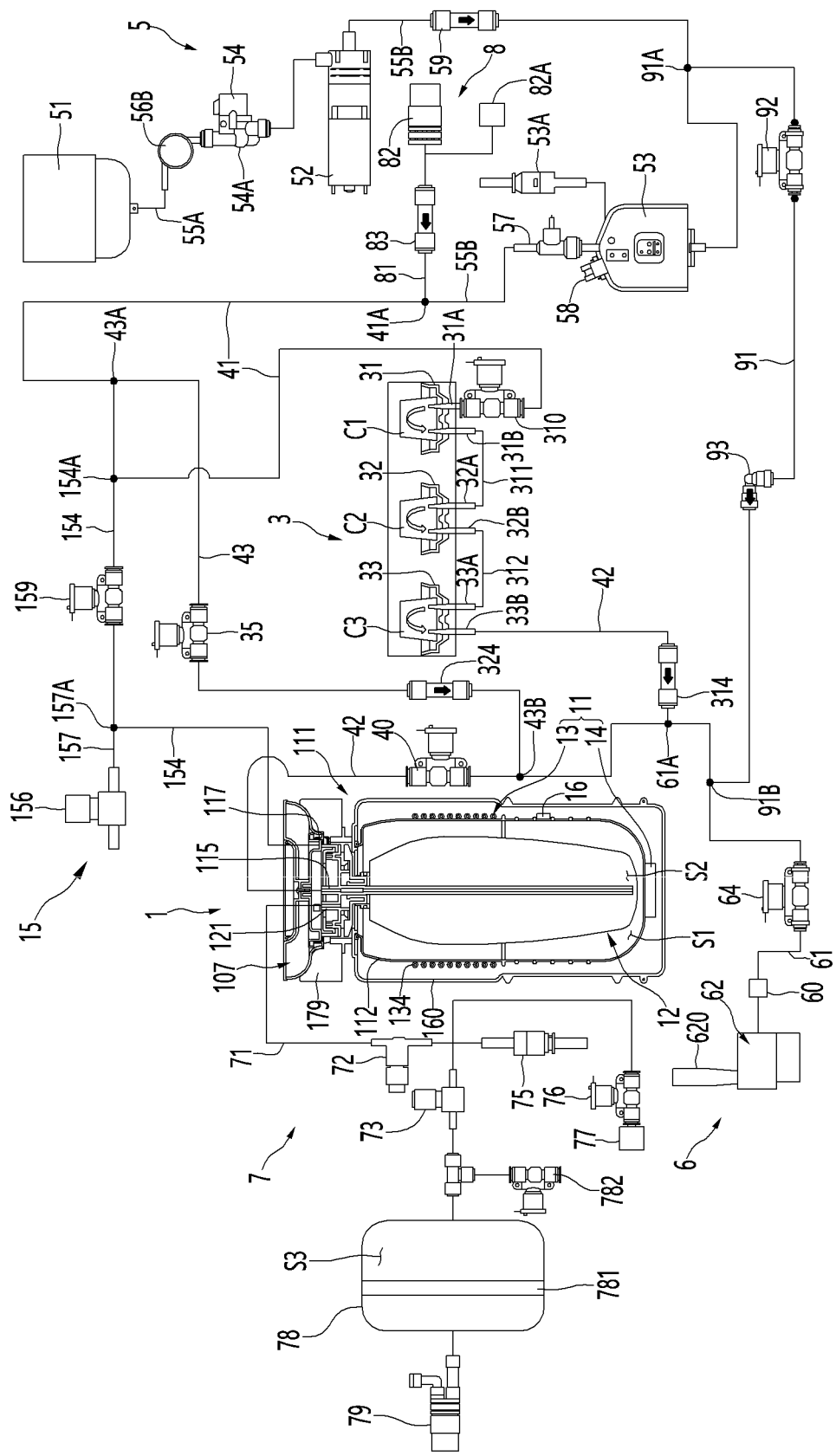
FIG. 1 is a diagram illustrating the configuration of a beverage maker according to an embodiment of the present disclosure.
Figure 2:
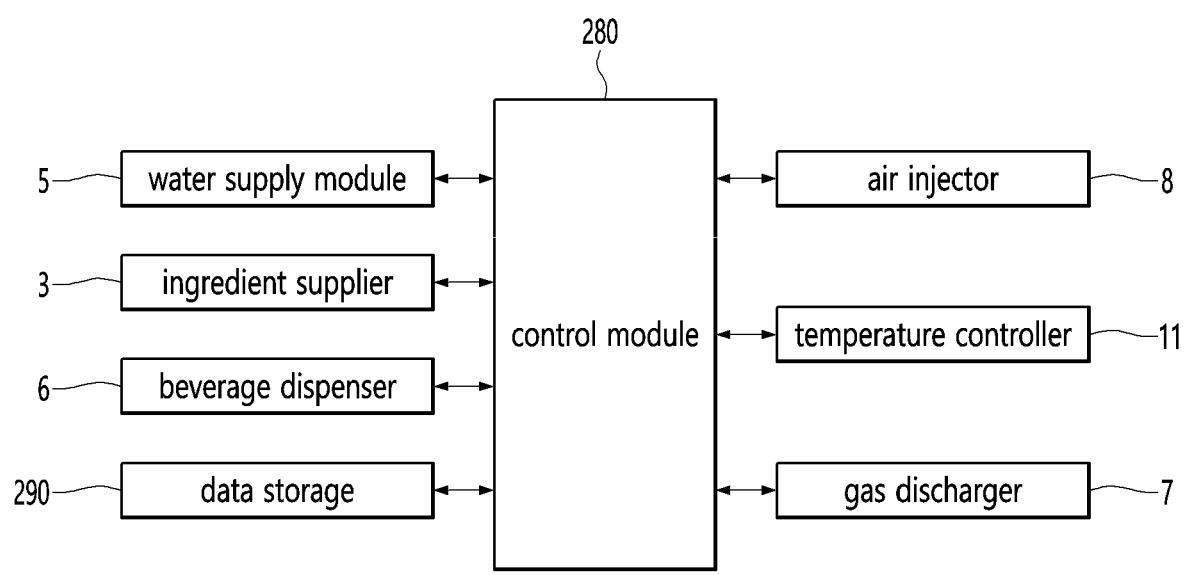
FIG. 2 is a block diagram illustrating the configuration of a beverage maker according to an embodiment of the present disclosure.

FIG. 1 is a diagram illustrating the configuration of a beverage maker according to an embodiment of the present disclosure and FIG. 2 is a block diagram illustrating the configuration of a beverage maker according to an embodiment of the present disclosure.

A beverage maker may include a fermentation module 1. A beverage may be fermented in the fermentation module 1 formed with a space (S1) in which beverages are fermented.

The beverage maker may include a temperature controller that controls an inner temperature of the fermentation module 1.

The beverage maker may include a water supply module 5. The water supply module 5 may supply water.

The beverage maker may include ingredient supplier 3 provided with ingredient accommodating portion 31, 32, and 33 in which ingredients required for making the beverage are accommodated.

The beverage maker may include main channel 41 and 42 connecting the water supply module 5 to the fermentation module 1.

The beverage maker may include a beverage dispenser 6 for dispensing the beverage made in the fermentation module 1 to the outside.

The beverage dispenser 6 may be connected to a second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector for injecting air. The air injector 8 may be connected to the water supply module 5 or a first main channel 41. The air injector may include an air pump 82.

The beverage maker may further include an air controller 15 controlling a pressure between an inner wall of a fermentation tank 112 and an outer surface of a fermentation container 12.

The beverage maker may further include a sub channel 91. The sub channel 91 may connect the water supply module 5 to the beverage dispenser 6.

Hereinafter, the fermentation module 1 will be described in detail.

The fermentation module 1 may include a fermentation tank module 111 having an opening and a fermentation lid 107 opening and closing the opening The fermentation tank module 111 may include a fermentation case 160 and a fermentation tank 112 accommodated in the fermentation case 160 and having the inner space S1. An insulation portion 104 may be provided between the fermentation case 160 and the fermentation tank 112. The fermentation tank 112 may further include a lid connector 179 on which the fermentation lid 107 is seated.

Each of the fermentation case 160 and the fermentation tank 112 may be provided as an assembly of a plurality of members. The fermentation case 160 may define an outer appearance of the fermentation tank module 111.

The fermentation lid 107 may seal the inside of the fermentation tank module 111 and be disposed on the fermentation tank module 111 to cover the opening S1. A main channel, particularly, a main channel connecting portion 115 connected to a second main channel 42 may be provided in the fermentation lid 107.

The fermentation container 12 may be provided as a separate container so that the beverage ingredients and the made beverage stain an inner wall of the fermentation tank 112. The fermentation container 12 may be separably disposed on the fermentation tank 112. The fermentation container 12 may be seated on the fermentation tank 112 to ferment the beverage within the fermentation tank 112. After the fermentation container 12 is used, the fermentation container 12 may be withdrawn to the outside of the fermentation tank 112.

The fermentation container 12 may be a pack containing the ingredients for making the beverage. The fermentation container 12 may be made of a flexible material. Thus, the fermentation container 12 may be easily inserted into the fermentation tank 112 and be contracted and expanded by a pressure. However, this embodiment is not limited thereto. For example, the fermentation container 12 may be made of a pet material.

The fermentation container 12 may have a beverage making space S2 in which the beverage ingredients are accommodated, and the beverage is made. The fermentation container 12 may have a size less than that of the inner space S1 of the fermentation tank 112.

The fermentation container 12 may be inserted and accommodated into the fermentation tank 112 in the state in which the ingredients are contained in the fermentation container 12. The fermentation container 12 may be inserted into the fermentation tank 112 and then accommodated in the fermentation tank 112 in the state in which the fermentation lid 107 is opened.

The fermentation lid 107 may seal the fermentation tank 112 after the fermentation container 12 is inserted into the fermentation tank 112. The fermentation container 12 may assist the fermentation of the ingredient in the state in which the fermentation container 12 is accommodated in the space S1 that is sealed by the fermentation tank 112 and the fermentation lid 107. The fermentation container 12 may be expanded by the pressure therein during the making of the beverage. The fermentation container 12 may be pressed by the air within the fermentation tank 112 when the beverage contained in the fermentation container 12 is dispensed, and the air is supplied between an inner surface of the fermentation tank 112 and the fermentation container 12.

The fermentation tank 112 may be disposed in the fermentation case 160. The fermentation tank 112 may have an outer circumference surface and a bottom surface, which are spaced apart from the inner surface of the fermentation case 160. In more detail, the outer circumference the fermentation tank 112 may be spaced apart from an inner circumference of the fermentation case 160, and an outer bottom surface of the fermentation tank 112 may be spaced apart from an inner bottom surface of the fermentation case 160.

The insulation portion (not shown) may be provided between the fermentation case 160 and the fermentation tank 112. The insulation portion may be disposed in the fermentation case 160 to surround the fermentation tank 112. Thus, the fermentation tank 112 may be constantly maintained in temperature.

The insulation portion may be made of a material such as foamed polystyrene or polyurethane which has high thermal insulating performance and absorbs vibration.

The fermentation tank 112 may include a temperature sensor 16 for measuring the temperature of the fermentation tank 112.

The temperature sensor 16 may be mounted on a circumferential surface of the fermentation tank 112. The temperature sensor 16 may be disposed below an evaporator 134 wound around the fermentation tank 112.

Hereinafter, the temperature controller 11 will be described in detail.

The temperature controller 11 may change an inner temperature of the fermentation tank 112. In more detail, the temperature controller 11 may change a temperature of the fermentation tank 112.

The temperature controller 11 may heat or cool the fermentation tank 112 to control a temperature of the fermentation tank 112 at an optimal temperature for fermenting the beverage.

The temperature controller 11 may include at least one of a refrigerant cycle device 13 and a heater 14. However, this embodiment is not limited thereto. For example, the temperature controller 11 may include a thermoelement TEM.

The refrigerant cycle device 13 may control the fermentation tank 112 to adjust a temperature of the fermentation tank 112. The refrigerant cycle device 13 may include a compressor, a condenser, an expansion mechanism, and an evaporator 134.

The evaporator 134 may be disposed to contact an outer surface of the fermentation tank 112. The evaporator 134 may be provided as an evaporation tube wound around an outer surface of the fermentation tank 112. The evaporator 134 may be accommodated between the fermentation tank 112 and the insulation portion to cool the fermentation tank 112 that is insulated by the insulation portion.

The temperature controller 11 may further include a heater 14 heating the fermentation tank 112. The heater 14 may be installed to contact the bottom surface of the fermentation tank 112. The heater 14 may be provided as a heat generation heater that generates heat when power is applied. The heater 14 may be provided as a plate heater.

Thus, the natural convection of a fluid may be generated inside the fermentation tank 112 by the evaporator 134 and the heater 14, and temperature distribution inside the fermentation tank 112 and the fermentation container 12 may be uniform.

Hereinafter, the main channel 41 and 42 and a bypass channel 43 will be described.

As described above, the main channel 41 and 42 may include a first main channel 41 connecting the water supply module 5 to the ingredient supplier 3 and a second main channel 42 connecting the ingredient supplier 3 to the fermentation module 1.

That is, the first main channel 41 may guide water supplied from the water supply module 5 to the ingredient supplier 3, and the second main channel 42 may guide the mixture of the ingredients and the water, which are extracted from the ingredient supplier 3, to the fermentation module 1.

The first main channel 41 may have one end 41A connected to the water supply module 5 and the other end connected to the ingredient supplier 3, more particularly, an inlet of an initial ingredient accommodating portion 31, which will be described below in more detail.

An ingredient supply valve 310 opening and closing the first main channel 41 may be installed in the first main channel 41. The ingredient supply valve 310 may be provided in the ingredient supplier 3.

The ingredient supply valve 310 may be opened when additives accommodated in the ingredient accommodating portions 31, 32, and 33 are put to open the first main channel 41. The ingredient supply valve 310 may be opened when the ingredient accommodating portions 31, 32, and 33 are cleaned to open the first main channel 41.

The second main channel 42 may have one end connected to a main channel connecting portion 115 of the fermentation module 1 and the other end connected to the ingredient supplier 3, more particularly, an outlet 33B of a final ingredient accommodating portion 33, which will be described below in more detail.

A main valve 40 opening and closing the second main channel 42 may be installed in the second main channel 42. Also, a main check valve 314 for allowing the fluid to flow from the ingredient supplier 3 to the fermentation module 1 may be installed in the second main channel 42. That is, the main check valve 314 may prevent the fluid from flowing back to the ingredient supplier 3.

The main check valve 314 may be disposed between the main valve 40 and the ingredient supplier 3 with respect to the second main channel 42.

The main valve 40 may be opened when the water is supplied to the fermentation container 12 to open the second main channel 42. The main valve 40 may be closed while the fermentation tank 112 is cooled to close the second main channel 42. The main valve 40 may be opened when the air is injected into the fermentation container 12 to open the second main channel 42. The main valve 40 may be opened when the additives are supplied into the fermentation container 1 to open the second main channel 42. The main valve 40 may be closed to seal the inside of the fermentation container 12 during the fermentation of the ingredients. The main valve 40 may be closed to seal the inside of the fermentation container 12 when the beverage is aged and stored. The main valve 40 may be opened when the beverage is dispensed by the beverage dispenser 6 to open the second main channel 4. The beverage within the fermentation container 1 may pass through the main valve 40 to flow to the beverage dispenser 6.

The main channel 41 and 42 may be provided as one continuous channel when the beverage maker does not include the ingredient supplier 3.

When the beverage maker includes the ingredient supplier 3, the beverage maker may further include a bypass channel 43 configured to allow the water or the air to bypass the ingredient accommodating portions 31, 32 and 33.

The bypass channel 43 may bypass the ingredient accommodating portions 31, 32, and 33 and then be connected to the first main channel 41 and the second main channel 42.

The bypass channel 43 may have one end connected to the first main channel 41 and the other end connected to the second main channel 42. In more detail, the bypass channel 43 may have one end 43A connected to the first main channel 41 between the water supply module 5 and the ingredient supply valve 310 and the other end 43B connected to the second main channel 42 between the main valve 40 and the ingredient supplier 3.

A bypass valve 35 opening and closing the bypass channel 43 may be installed in the bypass channel 43.

The bypass valve 35 may be opened when the water supplied from the water supply module 5 is supplied to the fermentation container 12 to open the bypass channel 43. The bypass valve 35 may be opened when the air injected from the air injector 8 is supplied to the fermentation container 12 to open the bypass channel 43. The bypass valve 35 may be opened when the bypass channel 43 is cleaned to open the bypass channel 43.

Also, a bypass check valve 324 allowing the fluid to flow from the first main channel 41 to the second main channel 42 may be installed in the bypass channel 43. That is, the fluid may flow only from the first main channel 41 to the second main channel 42 but may not flow in the opposite direction.

The bypass check valve 324 may be disposed between the bypass valve 35 and the second main channel 42 with respect to the bypass channel 43.

Hereinafter, the ingredient supplier 3 will be described in detail.

When beer is made by using the beverage maker, the ingredients for making the beer may include water, malt, yeast, hop, flavouring additives, and the like.

The beverage maker may include all of the ingredient supplier 3 and the fermentation container 12. The ingredients for making the beverage may be accommodated to be divided into the ingredient supplier and fermentation container 12. A portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the water supplied from the water supply module 5 and mixed with the portion of the ingredients accommodated in the fermentation container 12.

A main ingredient that is essential for making the beverage may be accommodated in the fermentation container 12, and the additives added to the main ingredient may be accommodated in the ingredient supplier 3. In this case, the additives accommodated in the ingredient supplier 3 may be mixed with the water supplied from the water supply module 5 and supplied to the fermentation container 12 and then be mixed with the main ingredient accommodated in the fermentation container 12.

The main ingredient accommodated in the fermentation container 12 may have a capacity greater than that of other ingredients. For example, when the beer is made, the main material may be the malt of the malt, the yeast, the hop, and the flavouring additives. Also, the additive accommodated in the ingredient supplier 3 may be the other ingredient except for the malt of the ingredient for making the beer, for example, the yeast, the hop, and the flavouring additives.

The beverage maker may not include the ingredient supplier 3 but include the fermentation container 12. In this case, the main ingredient may be accommodated in the fermentation container 12, and the user may directly put the additives into the fermentation container 12.

If the beverage maker includes all the ingredient supplier 3 and the fermentation container 12, the beverage may be more easily made. Hereinafter, the case in which the beverage maker includes all of the ingredient supplier 3 and the fermentation container, will be described as an example. However, this embodiment is not limited to the case in which the beverage maker includes all of the ingredient supplier 3 and the fermentation container 12.

The ingredients within the fermentation container 12 may be fermented as time elapses, and the beverage made in the fermentation container 12 may flow to the second main channel 42 through the main channel connecting portion 115 and also flow from the second main channel 42 to the beverage dispenser 6 so as to be dispensed.

The ingredients that are necessary for making the beverage may be accommodated in the ingredient supplier 3, and the water supplied from the water supply module 5 may pass through ingredient supplier 3. For example, when the beverage made in the beverage maker is beer, the ingredient accommodated in the ingredient supplier 3 may be yeast, hop, flavouring additives, and the like.

The ingredient accommodated in the ingredient supplier 3 may be directly accommodated into an ingredient accommodating portions 31, 32, and 33 provided in the ingredient supplier 3. At least one ingredient accommodating portion 31, 32, and 33 may be provided in the ingredient supplier 3. The plurality of ingredient accommodating portions 31, 32, and 33 may be provided in the ingredient supplier. In this case, the ingredient accommodating portions 31, 32, and 33 may be partitioned with respect to each other.

Inlets 31A, 32A, and 33A through which the fluid is introduced and outlets 31B, 32B, and 33B through which the fluid is discharged may be provided in the ingredient accommodating portions 31, 32, and 33, respectively. The fluid introduced into the inlet of one ingredient accommodating portion may be mixed with the ingredients within the ingredient accommodating portions and then discharged through the outlet.

The ingredients accommodated in the ingredient supplier 3 may be accommodated in capsule C1, C2, and C3. In this case, the capsule C1, C2, and C3 may be accommodated in the ingredient accommodating portion 31, 32, and 33, and the ingredient accommodating portion 31, 32, and 33 may be called a capsule mounting portion.

When the ingredients are accommodated in the capsules C1, C2, and C3, the ingredient supplier 3 may be configured so that the capsules C1, C2, and C3 are seated and withdrawn. The ingredient supplier may be provided as a capsule kit assembly in which the capsules C1, C2, and C3 are separably accommodated.

For example, a first additive, a second additive, and a third additive may be accommodated in the ingredient supplier 3.

The first additive may be yeast, the second additive may be hop, and the third additive may be a flavouring additive. The ingredient supplier 3 may include a first capsule mounting portion 31 in which a first capsule C1 containing the first additive is accommodated, a second capsule mounting portion 32 in which a second capsule C2 containing the second additive is accommodated, and a third capsule mounting portion 33 in which a third capsule C3 containing the third additive is accommodated.

The ingredients contained in the ingredient accommodating portion or the capsules C1, C2, and C3 may be extracted by a water pressure of the water supplied from the water supply module 5.

When the ingredients are extracted by the water pressure, the water supplied from the water supply module 5 to the first main channel 41 may pass through the ingredient accommodating portion or the capsules C1, C2, and C3 and then be mixed with the ingredients, and the ingredients accommodated in the ingredient accommodating portion or the capsules C1, C2, and C3 may flow to the second main channel 42 together with the water.

A plurality of additives different from each other may be accommodated to be divided in the ingredient supplier 3. For example, when the beer is made, the plurality of additives accommodated in the ingredient supplier 3 may be the yeast, the hop, and the flavouring additive, which are accommodated to be divided from each other.

When the plurality of ingredient accommodating portions are provided in the ingredient supplier 3, the plurality of ingredient accommodating portions 31, 32, and 33 may be connected in series to each other in a flow direction of the water.

In more detail, the ingredient supplier 3 may include at least one connecting channel 311 and 312 connecting the outlet of one ingredient accommodating portion of the plurality of ingredient accommodating portions 31, 32, and 33 to the inlet of the other ingredient accommodating portion.

Also, the plurality of ingredient accommodating portions 31, 32, and 33 may include an initial ingredient accommodating portion 31 and a final ingredient accommodating portion 33. The plurality of ingredient accommodating portions 31, 32, and 333 may further include an intermediate ingredient accommodating portion 32.

The inlet 31A of the initial ingredient accommodating portion 31 may be connected to the first main channel 41, and the outlet 33B of the final ingredient accommodating portion 33 may be connected to the second main channel 42.

The intermediate ingredient accommodating portion 32 may be disposed between the first ingredient accommodating portion 31 and the second ingredient accommodating portion 33 in the flow direction of the fluid. The inlet 32A and the outlet 32B of the intermediate ingredient accommodating portion 32 may be connected to the connecting channels 311 and 312 different from each other.

As illustrated in FIG. 1, when three ingredient accommodating portions are provided in the ingredient supplier 3, the outlet 31B of the final ingredient accommodating portion 31 may be connected to the inlet 32A of the intermediate ingredient accommodating portion 32 through the first connecting channel 311, and the outlet 32B of the intermediate ingredient accommodating portion 32 may be connected to the inlet 33A of the final ingredient accommodating portion 33 through the second connecting channel 312.

In this case, the water introduced into the inlet 31A of the final ingredient accommodating portion 31 through the first main channel 41 may flow to the first connecting channel 311 through the outlet 31B together with the first additive accommodated in the initial ingredient accommodating portion 31.

The fluid (the mixture of the water and the first additive) introduced into the inlet 32A of the intermediate ingredient accommodating portion 32 through the first main channel 311 may flow to the second connecting channel 312 through the outlet 32B together with the second additive accommodated in the intermediate ingredient accommodating portion 32.

The fluid (the mixture of the water and the first and second additives) introduced into the inlet 33A of the final ingredient accommodating portion 33 through the second main channel 312 may flow to the second connecting channel 42 through the outlet 33B together with the third additive accommodated in the final ingredient accommodating portion 33.

The fluid (the mixture of the water and the first, second, and third additives) discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient accommodating portion is not provided, two ingredient accommodating portions may be provided in the ingredient supplier 3. In this case, one ingredient accommodating portion may be the initial ingredient accommodating portion, and the other ingredient accommodating portion may be the final ingredient accommodating portion. The outlet of the initial ingredient accommodating portion and the inlet of the final ingredient accommodating portion may be connected to each other by the connecting channel.

For another example, when the intermediate ingredient accommodating portion is provided in plurality, four or more ingredient accommodating portions may be provided in the ingredient supplier 3. In this case, one ingredient accommodating portion may be the initial ingredient accommodating portion, the other ingredient accommodating portion may be the final ingredient accommodating portion, and the remaining ingredient accommodating portion may be the intermediate ingredient accommodating portion. In this case, since the connection between the ingredient accommodating portions in series is easily understood by the person skilled in the art, their detailed descriptions will be omitted.

Since the plurality of ingredient accommodating portions 31, 32, and 33 are connected in series to each other, the channel configuration of the ingredient supplier 3 may be simplified.

Also, since the additives contained in the capsules C1, C2, and C3 are extracted at once, a time taken to extract the additives may decrease. Also, since the user does not have to worry about the mounting order of the capsules C1, C2, and C3, malfunction due to the mounting of the capsules C1, C2, and C3 in erroneous order may not occur. Also, the ingredient supplier 3 may be minimized in water leakage point to improve reliability.

When the ingredients accommodated in the ingredient supplier 3 are accommodated in the capsules C1, C2, and C3, the initial ingredient accommodating portion 31 may be called an initial capsule mounting portion, the intermediate ingredient accommodating portion 32 may be called an intermediate capsule mounting portion, and the final ingredient accommodating portion 33 may be a final capsule mounting portion.

The water supply module 5 may include a water tank 51, a water supply pump 52 for pumping water within the water tank 51, and a water supply heater 53 for heating the water pumped by the water supply pump 52.

The water supply module 5 may further include the water supply pump 52 for pumping water within the water tank 51 and the water supply heater 53 for heating the water pumped by the water supply pump 52.

The water tank 51 and the water supply pump 52 may be connected to a water tank discharge channel 55A, and the water contained in the water tank 51 may be introduced into the water supply pump 52 through the water tank discharge channel 55A.

The water supply pump 52 and one end of the first main channel 41 may be connected to a water supply channel 55B, and the water discharged from the water supply pump may be guided to the first main channel 41 through the water supply channel 55B.

A flow meter 56 for measuring a flow rate of the water discharged from the water tank 51 may be installed in the water tank discharge channel 55A.

Also, a flow rate control valve 54 for controlling the flow rate of the water discharged from the water tank 51 may be installed in the water tank discharge channel 55A. The flow rate control valve 54 may include a step-in motor.

Also, a thermistor 54A for measuring a temperature of the water discharged from the water tank 51 may be installed in the water tank discharge channel 55A. The thermistor 54A may be built in the flow rate control valve 54.

A water supply check valve 59 for preventing the water from flow back to the water supply pump 52 may be installed in the water supply channel 55B.

The water supply heater 53 may be installed in the water supply channel 55B.

The water supply heater 53 may be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is high may be installed in the water supply heater 53.

The water supply module 5 may further include a safety valve 53A. The safety valve 53A may communicate with the inside of the heater case of the water supply heater 53. The safety valve 53A may restrict a maximum internal pressure of the heater case. For example, the safety valve 53A may restrict a maximum internal pressure of the heater case to a pressure of about 3.0 bar.

The water supply module 5 may further include a water supply temperature sensor 57 for measuring a temperature of the water passing through the water supply heater 53. The water supply temperature sensor 57 may be installed in the water supply heater 53. Alternatively, the water supply temperature sensor 57 may be disposed at a portion of the water supply channel 55B behind the water supply heater 53 in the flow direction of the water. Also, the water supply temperature sensor 57 may be installed in the first main channel 41.

When the water supply pump 52 is driven, the water within the water tank 51 may be introduced into the water supply pump 52 through the water tank discharge channel 55A, and the water discharged from the water supply pump 52 may be heated in the water supply heater 53 while flowing through the water supply channel 55B and then be guided to the first main channel 41.

Hereinafter, the beverage dispenser 6 will be described.

The beverage dispenser 6 may be connected to the second main channel 42.

In more detail, the beverage dispenser 6 may include a dispenser 62 for dispensing the beverage and a beverage dispensing channel 61 connecting to the dispenser 62 to the second main channel 42.

The beverage dispensing channel 61 may have one end 61A connected between the main check valve 314 and the main valve 40 with respect to the second main channel 42 and the other end connected to the dispenser 62.

A beverage dispensing valve 64 opening and closing the beverage dispensing channel 61 may be installed in the beverage dispensing channel 61.

The beverage dispensing valve 64 may be opened when the beverage is dispensed to open the beverage dispensing channel 61. The beverage dispensing valve 64 may be opened when residual water is removed to open the beverage dispensing channel 61. The beverage dispensing valve 64 may be opened when the beverage dispenser is cleaned to open the beverage dispensing channel 61.

An anti-foaming member (not shown) may be provided in the beverage dispensing channel 61, and an amount of foam of the beverage flowing from the second main passage 42 to the beverage dispensing channel 61 may be minimized while passing through the anti-foaming part. A mesh for filtering the foam may be provided in the anti-foaming member.

When the beverage is dispensed, the beverage dispensing valve 64 may be opened. When the beverage is not dispensed, the closed state of the beverage dispensing valve 64 may be maintained.

The dispenser 62 may include a lever 620 operated by a user and a tap valve having a limit switch for detecting user's operation.

Hereinafter, the gas discharger 7 will be described in detail.

The gas discharger 7 may be connected to the fermentation module 1 to discharge a gas generated in the fermentation container 12.

In more detail, the gas discharger 7 may include a gas discharge channel 71 connected to the fermentation module 1, a gas pressure sensor 72 installed in the gas discharge channel 71, and a gas discharge valve 73 connected behind the gas pressure sensor 72 in the gas discharge channel 71 in the gas discharge direction.

In the present disclosure, gas generated when making beverage may mean gas generated while beverage is fermented in the beverage making space S2 of the fermentation container 12.

The gas discharger 7 may include a storage tank 78 connected to the gas discharge valve 73 and having a space S3 capable of accommodating gas therein, and an actuator 79 for injecting gas collected in the space S3 of the storage tank 78 to the fermentation module 1 through the gas discharge channel 71.

The gas discharge channel 71 may be connected to the fermentation module 1, particularly, the fermentation lid 107. A gas discharge channel connecting portion 121 to which the gas discharge channel 71 is connected may be provided in the fermentation lid 107.

The gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be turned to be opened when the air is injected into the fermentation container 12 by the air injector 8. The beverage maker may uniformly mix the malt with the water by injecting the air into the fermentation container 12. Here, foam generated in the liquid malt may be discharged from the upper portion of the fermentation container 12 to the outside through the gas discharge channel 71 and the gas discharge valve 73.

In addition, gas generated in the fermentation container 12 may be collected in the space S3 of the storage tank 78 through the gas discharge channel 71 and the gas discharge valve 73.

The gas discharge valve 73 may be turned on to detect fermentation during the fermentation process and then tuned off to be closed.

When the fermentation process is completed, the actuator 79 may flow gas accommodated in the space S3 of the storage tank 78 to the fermentation module 1 through the gas discharge channel 71. When the fermentation container 12 is provided inside the fermentation module 1, the actuator 79 may also flow gas accommodated in the space S3 of the storage tank 78 to the fermentation container 12 through the gas discharge channel 71.

The gas discharger 7 may further include a gas release valve 782 for discharging the gas accommodated in the space S3 of the storage tank 78 to the outside.

Specifically, when the fermentation process is completed, the actuator 79 may flow the gas accommodated in the space S3 of the storage tank 78 to the fermentation module 1, and the gas release valve 782 may be opened to discharge the gas remaining in the space S3 of the storage tank 78 to the outside after the gas accommodated in the space S3 of the storage tank 78 flows to the fermentation module 1.

The gas discharger 7 may further include the safety valve 75 connected to the gas discharge channel 71. The safety valve 75 may be connected behind the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76.

The pressure release valve 76 may be connected to the gas discharge channel 71. The pressure release valve 76 and the gas discharge valve 73 may be selectively opened/closed.

The gas discharge channel 71 may be branched to be respectively connected to the gas discharge valve 73 and the pressure release valve 76.

The pressure release valve 76 may be controlled to be opened/closed while the beverage ingredients are fermented.

Hereinafter, the air injector 8 will be described.

The air injector 8 may be connected to the water supply module 55B or the first main channel 41 to inject air. Hereinafter, for convenience of description, the case in which the air injector 8 is connected to the water supply channel 55B will be described as an example.

The air injector 8 may be connected to an opposite side of a sub channel 91, which will be described later, with respect to the water supply heater 53.

In this case, the air injected into the air injector 8 may pass through the water supply heater 53 to flow to the sub channel 91 together with the residual water within the water supply heater 53. Thus, the residual water within the water supply heater 53 may be removed to maintain a clean state of the water supply heater 53.

Alternatively, the air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supplier 3 to flow to the capsule mounting portions 31, 32, and 33. The residual water or residues within the capsules C1, C2, and C3 or the capsule mounting portions 31, 32, and 33 may flow the second main channel 42 by the air injected by the air injector 8. The capsules C1, C2, and C3 and the capsule mounting portions 31, 32, and 33 may be cleanly maintained by the air injected by the air injector 8.

The air injector 8 may include an air injection channel connected to the water supply channel 55B or the first main channel 41 and an air pump 82 connected to the air injection channel 81. The air pump 82 may pump the air to the air injection channel 81.

An air injection check valve 83 preventing the water flowing to the water supply channel 55B by the water supply pump 52 from being introduced into the air pump 82 through the air injection channel 81 may be installed in the air injection channel 81.

The air injector 8 may further include an air filter 82A. The air filter 82A may be provided in a suction side of the air pump 82, and thus, external air may be suctioned into the air pump 82 by passing through the air filter 82A. Thus, the air pump 82 may inject clean air into the air injection channel 81.

Hereinafter, the air controller 15 will be described in detail.

The air controller 15 may control a pressure between an inner wall of the fermentation tank 112 and an outer surface of the fermentation container 12.

The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1 and an exhaust channel 157 connected to the air supply channel 154 to exhaust the air to the outside.

The air supply channel 154 may have one end connected to the first main channel 41 and the other end connected to the fermentation module 1.

The air supply channel 154 may be connected to the fermentation module 1, particularly, the fermentation lid 107. An air supply channel connecting portion 117 to which the air supply channel 154 is connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154.

The air injector 8 may function as an air supplier for supplying the air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112.

The beverage within the fermentation container 12 may be pressed by the fermentation container 12 that is pushed by the air. When the main valve 40 and the beverage dispensing valve 64 are opened, the beverage may pass through the main channel connecting portion 115 to flow the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may be occur between the fermentation container 12 and the fermentation tank 112.

The air pump 82 may be maintained in the turn-off state while the beverage is dispensed. When the beverage is completely dispensed, the air pump 82 may be driven for next beverage dispensing and then stopped.

Thus, when the beverage is completely made, the beverage maker may dispense the beverage within the fermentation container 12 to the beverage dispensing channel module 6 in the state in which the fermentation container 1 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not connected to the first main channel 41. However, the injection of the air into the fermentation container 12 by the air pump 82 and the supplying of the air into the space between the fermentation container 12 and the fermentation tank 112 may be combined with each other to realize a compact product and reduce a manufacturing cost.

The exhaust channel 157 may function as an air exhaust passage, through which the air between the fermentation container 12 and the fermentation tank 112 is exhausted to the outside, together with a portion of the air supply channel 154.

The exhaust channel 157 may be disposed outside the fermentation module 1. The exhaust channel 157 may be connected to a portion of the air supply channel 154, which is disposed outside the fermentation tank 112.

The air supply channel 154 may include a first channel connected between a connecting portion 157A connected to the first main channel 41 and the exhaust channel 157 and a second channel connected between the connecting portion 154A connected to the exhaust channel 157 and the air supply channel connecting portion 117. The first channel may be an air supply channel for guiding the air pumped by the air pump 82 to the second channel. Also, the second channel may be an air supply and exhaust-combined channel for supplying the air passing through the air supply channel into the space between the fermentation tank 112 and the fermentation container 12 or guiding the air discharged from the space between the fermentation tank 112 and the fermentation container 12 t the connecting channel 157.

The exhaust channel 157 may be connected to the exhaust valve 156 for opening and closing the exhaust channel 157.

The exhaust valve 156 may be opened so that the air between the fermentation container 12 and the fermentation tank 112 is exhausted to the outside when the fermentation container 12 is expanded while the beverage is made. The exhaust valve 156 may be controlled to be opened when the water is supplied by the water supply module 5. The exhaust valve 156 may be controlled to be opened when the air is injected by the air injection channel module 8.

The exhaust valve 156 may be opened so that the air between the fermentation container 12 and the fermentation tank 112 is exhausted when the beverage within the fermentation container 12 is completely dispensed. The user may take the fermentation container out of the fermentation tank 112 when the beverage is completely dispensed. This is done because safety accidents occur when the inside of the fermentation tank 112 is maintained at a high pressure. The exhaust valve 156 may be controlled to be opened when the beverage within the fermentation container 12 is completely dispensed.

The air controller 15 may further include an air supply valve 159 that restricts the air pumped by the air pump 82 and supplied between the fermentation container 12 and the fermentation tank 112.

The air supply valve 159 may be installed in the air supply channel 154. In more detail, the air supply valve 159 may be installed between the connecting portion 154A of the first main channel 41 and the connecting portion 157A of the exhaust channel 157 in the air supply channel 154.

Hereinafter, the sub channel 91 will be described in detail.

The sub channel 91 may connect the water supply module 5 to the beverage dispenser 6. In more detail, the sub channel 91 may have one end 91A connected to the water supply channel 55B and the other end 91B connected to the beverage dispensing channel 61.

The sub channel 91 may be connected between the water supply pump 52 and the water supply heater 53 with respect to the water supply channel 55B.

Also, the sub channel 91 may be connected to the connecting portion 61A of the second main channel 42 and the beverage dispensing valve 64 with respect to the beverage dispensing channel 61.

The water supplied by the water supply pump 52 and the air pumped by the air pump 82 may be guided to the beverage dispensing channel 61 through the sub channel 91 and then be dispensed to the dispenser 62. Thus, the residual water or the beverage remaining in the beverage dispenser 6 may be removed.

A sub valve 92 opening and closing the sub channel 91 may be installed in the sub channel 91.

The sub valve 92 may be opened when the beverage is dispensed, or the cleaning is performed to open the sub channel 91.

Also, a sub check valve 93 for preventing the beverage of the beverage dispensing channel 61 from flowing back to the water supply module 5 may be installed in the sub channel 91. The sub check valve 93 may be disposed between the sub valve 92 and the beverage dispensing channel 61 with respect to the sub channel 91.

The sub channel 91 may function as a residual water removing channel of the water supply module 5. For example, when the air pump 82 is turned on in the state in which the air supply valve 159, the bypass valve 35, and the ingredient supply valve 310 are closed, the sub valve 92 is opened, the air injected into the air injection channel 81 may pass through the water supply heater 53 to flow to the sub channel 91. Then, the air may pass through the sub valve 92 to flow to the beverage dispensing channel 61 and then be dispensed to the dispenser 62. In this process, the air may be dispensed together with the water supply module 5, more particularly, the residual water remaining the water supply heater 53 and the water supply channel 55B so that residual water is removed.

In addition, the sub channel 91 may function as a cleaning channel. This will be described in detail in cleaning steps S100 and S1100 and a dispenser cleaning process of a beverage dispensing step S1000, which will be described later.

As shown in FIG. 2, operation related to the water supply module 5, the ingredient supplier 3, the beverage dispenser 6, the air injector 8, the temperature controller 11, the gas discharger 7 and a data storage 290 included in the beverage maker and other beverage maker control may be performed by the control module 280 or the controller 281A of the beverage maker.

Figure 3:
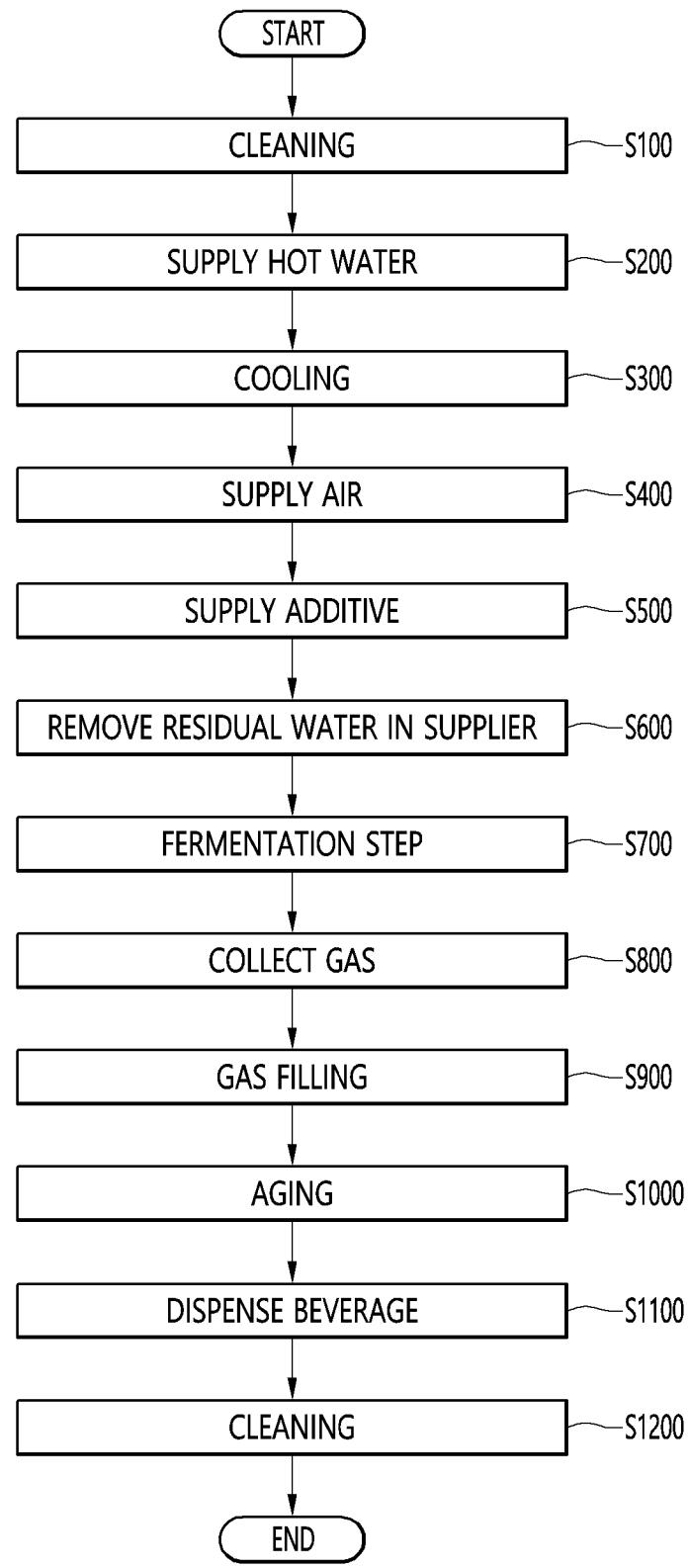
FIG. 3 is a flowchart illustrating a method of controlling a beverage maker according to an embodiment of the present disclosure.

FIG. 3 is a flowchart illustrating a method of controlling a beverage maker according to an embodiment of the present disclosure.

Hereinafter, operation of the beverage maker of the present embodiment will be described with reference to FIG. 1 and FIG. 2.

The beverage maker of the present embodiment may include steps S100 and S1200 of cleaning the channel therein. The cleaning steps S100 and S1200 may be performed separately a beverage making step.

The cleaning steps S100 and S1200 may be preferably performed before the beverage making step and after the beverage making step.

In addition, the cleaning steps S100 and S1100 may be performed by user input during the beverage making step, and, in this case, may be performed while the main valve 40 may be closed and an additive is not contained in the ingredient supplier 3 as in a fermentation step S700.

The cleaning steps S100 and S1200 may be performed in a state in which the capsules C1, C2 and C3 are not accommodated in the ingredient supplier 3.

In contrast, the beverage making step may be performed in a state in which the capsules C1, C2 and C3 are accommodated in the ingredient supplier 3 and the fermentation container 12 is accommodated in the fermentation tank 112.

The user may input a cleaning command through the input unit provided in the control module 280, a remote controller or a portable terminal. The controller 281A may control the beverage maker to perform the cleaning steps S100 and S1200 according to input of the cleaning command.

In addition, the user may input a beverage making command through the input unit provided in the control module 280, a remote controller or a portable terminal. The controller 281A may automatically control the beverage maker to perform the cleaning steps S100 and S1200, before and after the beverage making step according to input of the beverage making command.

Hereinafter, the cleaning step S100 performed before the beverage making step will be first described.

When the dispenser 62 is closed, the controller 281A may display a message to open the dispenser 62 on the display 282 and the user may open the dispenser 62.

When the dispenser 62 is opened and the cleaning command is input through the input unit, the remote controller or the portable terminal, the controller 281A may open the beverage dispensing channel 64 and turn on the water supply pump 52 and the water supply heater 53. In addition, the controller 281A may maintain the closed state of the main valve 40.

The controller 281A may perform cleaning of the ingredient supplier 3 and a bypass channel 4C. The controller 281A may open an ingredient supply valve 310 and a bypass valve 35. In addition, the controller 281A may perform cleaning of the sub channel 91. The controller 281A may open a sub valve 92.

When the water supply pump 52 is turned on, water of the water tank 51 may flow to the water supply heater 53 to be heated by the water supply heater 53.

Water (that is, hot water) heated by the water supply heater 53 may divisionally flow to the sub channel 91 and the first main channel 41.

Water flowing to the sub channel 91 may flow to the beverage dispensing channel 61 through the sub valve 92 and may pass through the beverage dispensing channel 64 to be dispensed through the dispenser 62.

In addition, water flowing to the first main channel 41 may divisionally flow to the ingredient supplier 3 and a bypass channel 43.

Water flowing to the ingredient supplier 3 may sequentially pass through the ingredient supply valve 310, an initial capsule mounting portion 31, an intermediate capsule mounting portion 32 and a final capsule mounting portion 33 to flow to the second main channel 43, and flow to the beverage dispensing channel 62 to pass through the beverage dispensing channel 64, thereby being dispensed through the dispenser 62.

Water flowing to the bypass channel 43 may pass through the bypass valve 35 to flow to the second main channel 43, and flow to the beverage dispensing channel 62 to pass through the beverage dispensing channel 64, thereby being dispensed through the dispenser 62.

During control described above, the main channels 41 and 42, the bypass channel 43, the sub channel 91, the beverage dispensing channel 64, the valves mounted in each channel and the dispenser 62 may be sterilized and cleaned. In addition, the capsule mounting portions 31, 32 and 33 and the connecting channels 311 and 312 may be sterilized and cleaned.

The beverage maker may perform cleaning during a cleaning set time and complete the cleaning process after the cleaning set time.

The controller 281A may turn off the water supply pump 52 and the water supply heater 53 after the cleaning set time has elapsed, and close all the beverage dispensing channel 64, the bypass valve 35, the ingredient supply valve 310 and the sub valve 92.

In addition, the beverage maker of the present embodiment may include a beverage making step of making beverage.

For the beverage making step, the user may open the fermentation lid 107 and insert the fermentation container 12 through the opening 170 such that the fermentation container is seated on the fermentation tank module 111. In this case, malt may be accommodated in the fermentation container 12. The malt may be accommodated in the form of barley malt.

Thereafter, the user may close the fermentation lid 107, and the fermentation container 12 may be accommodated in the fermentation tank module 111 and the fermentation lid 107. In this case, the inside of the fermentation tank 112 may be closed by the fermentation lid 107.

In addition, the user may insert the plurality of capsules C1, C2 and C3 into the ingredient supplier 3 and then cover the plurality of capsule mounting portions 31, 32 and 33 with the lid module 37, before and after the fermentation container 12 is seated.

The user may input a beverage making command through the input unit connected to the controller 281A, the remote controller or the mobile terminal. The controller 281A may control the beverage maker to perform the beverage making step according to input of the beverage making command.

The beverage making step may include a water supply step S200.

The water supply step S200 may be used interchangeably with a hot water supply step.

The water supply step S200 may be a liquid malt formation step of forming liquid malt by evenly mixing the malt in the fermentation container 12 with hot water.

The controller 281A may turn on the water supply pump 52 and the water supply heater 53 and maintain the closed state of the ingredient supply valve 310, during the water supply step S200. The controller 281A may open the bypass valve 35 and the main valve 40 during the water supply step S200.

Meanwhile, the controller 281A may open the exhaust valve 156 when water is supplied to the fermentation container 12.

During control, water discharged from the water tank 51 may pass through the water supply pump 52, and flow to the water supply heater 53, thereby being heated by the water supply heater 53. Water heated by the water supply heater 53 may flow from the first main channel 41 to the bypass channel 43, and pass through the bypass valve 35 to flow to the second main channel 42. Water flowing to the second main channel 42 may pass through the main valve 40 and flow into the fermentation container 12. Hot water flowing into the fermentation container 12 may be mixed the malt accommodated in the fermentation container 12, and the malt in the fermentation container 12 may be mixed with water, thereby being gradually diluted. When hot water is supplied to the fermentation container 12, the malt accommodated in the fermentation container 12 may be rapidly and evenly mixed with the hot water.

The fermentation container 12 may gradually expand when water is introduced, and some of air between the outer surface of the fermentation container 12 and the inner wall of the fermentation tank 112 may flow to the air supply channel 154 to be discharged through the exhaust valve 156, as the fermentation container 12 expands.

Therefore, while water flows into the fermentation container 12, the fermentation container 12 may be supplied with water inside the fermentation tank 112 without being burst or torn.

Meanwhile, during the water supply step S200, the water supply heater 53 preferably heats water to 50° C. to 70° C., and the controller 281A may control the water supply heater 53 according to the temperature detected by the water supply temperature sensor 57.

The controller 281A may perform the water supply step S200 until the quantity of accumulated water detected by the flow meter 56 reaches a set quantity and complete the water supply step S200 when the quantity of accumulated water detected by the flow meter 56 reaches the set quantity.

When the water supply step S200 is completed, the controller 281A may turn off the water supply pump 52 and the water supply heater 53 and close the bypass valve 35. The controller 281A may close the gas discharge valve 73 and the exhaust valve 156, when the water supply step S200 is completed.

Meanwhile, the controller 281A may perform control such that air is introduced into the fermentation container 12, during the water supply step S200.

The controller 281A may perform and stop primary supply of water to the fermentation container 12, perform and stop injection of air into the fermentation container 12, perform and stop secondary supply of hot water to the fermentation container 12, and complete the water supply step S200 after primary supply of water, air injection and secondary supply of water are sequentially completed.

As an example of the water supply step S200, only a hot water supply process of supplying hot water may be performed.

As another example of the water supply step S200, a primary hot water supply process of primarily supplying hot water, an air injection process of injecting air and a secondary hot water supply process of secondarily supplying hot water may be sequentially performed.

The case where the water supply step S200 performs only the hot water supply process as an example of the water supply step S200 is equal to the above description and thus a detailed description thereof will be omitted.

Hereinafter, as another example of the water supply step S200, the case where a primary hot water supply process, an air injection process and a secondary hot water supply process are sequentially performed as the water supply step S200 will be described.

The controller 281A may turn on the water supply pump 52 and the water supply heater 53, turn off the bypass valve 35 and the main valve 40, and maintain the closed state of the ingredient supply valve 310, when the primary hot water supply process starts. In addition the controller 281A may open the gas discharge valve 73 and the exhaust valve 156, when the primary hot water supply process starts.

During the primary hot water supply process, water may flow into the fermentation container 12, the fermentation container 12 may expand by the water, some of air between the fermentation container 12 and the fermentation tank 112 may be pushed by the expanded fermentation container 12 to flow to the air supply channel 154 and may be discharged to the outside through the exhaust valve 156.

In addition, the controller 281A may determine completion of the primary hot water supply process according to the flow rate detected by the flow meter 56 during the primary hot water supply process. The controller 281A may determine that the primary hot water supply process is completed when the flow rate detected by the flow meter 56 reaches a first set flow rate during the primary hot water supply process, turn off the water supply pump 52 and the water supply heater 53, and maintain the open state of the bypass valve 35 and the main valve 40. In addition, the controller 281A may maintain the open state of the gas discharge valve 73 and the exhaust valve 156, when the primary hot water supply process is completed.

When the primary hot water supply process is completed, the air injection process may be performed.

The controller 281A may turn on the air pump 82, when the air injection process starts. In addition, the controller 281A may maintain the closed state of the air supply valve 159.

While the air pump 82 is turned on, air injected into the air injection channel 81 may flow from the first main channel 41 to the second main channel 42 through the bypass channel 43, and passes through the main valve 40 to flow into the fermentation container 12. Air flowing into the fermentation container 12 may collide with the liquid malt, thereby helping to more evenly mix the malt with hot water.

As air is introduced into the fermentation container 12, the fermentation container 12 may expand, and some of air between the outer surface of the fermentation container 12 and the inner wall of the fermentation tank 112 may be pushed by the expanded fermentation container 12 to flow to the air supply channel 154, and may be discharged to the outside through the exhaust valve 156.

When the pressure detected by the gas pressure sensor 72 is equal to or greater than set pressure, the controller 281A may complete the air injection process and turn off the air pump 82 in order to complete the air injection process. The control module 280 may maintain the open state of the main valve 40, the bypass valve 35, the gas discharge valve 73 and the exhaust valve 156, when the air injection process is completed.

When the air injection process is completed, the secondary hot water supply process may be performed.

The controller 281A may turn on the water supply pump 52 and the water supply heater 53, when the secondary hot water supply process starts.

Water of the water tank 51 may be supplied to the fermentation container 12 as in the primary hot water supply process, and new hot water may be additionally supplied to the fermentation container 12.

During the secondary hot water supply, the fermentation container 12 may further expand by additionally introduced water, and some of air between the outer surface of the fermentation container 12 and the inner wall of the fermentation tank 112 may be pushed the expanded fermentation container 12 to flow to the air supply channel 154, and may be discharged to the outside through the exhaust valve 156.

The controller 281A may determine completion of the secondary hot water supply process according to the flow rate detected by the flow meter 56 during the secondary hot water supply process. When the flow rate detected by the flow meter 56 reaches a second set flow rate during the secondary hot water supply process, the controller 281A may determine that the secondary hot water supply process is completed, turn off the water supply pump 52 and the water supply heater 53, and close the main valve 40 and the bypass valve 35. In addition, when the secondary hot water supply process is completed, the controller 281A may close the gas discharge valve 73 and the exhaust valve 156.

Meanwhile, the beverage making step may include a fermentation tank cooling step S300.

More specifically, when the water supply step S200 is completed, the fermentation tank cooling step S300 of cooling the fermentation tank 112 may be performed.

The controller 281A may control the temperature controller 11 to cool the fermentation tank 112. More specifically, the controller 281A may control the refrigerant cycle device 13 to cool the fermentation tank 112. Refrigerant take heat out of the fermentation tank 112 while passing through the evaporator 134, thereby being evaporated. When the refrigerant cycle device 13 is driven, the fermentation tank 112 may be gradually cooled, and the fermentation container 12 accommodated in the fermentation tank 112 and the liquid malt accommodated in the fermentation container 12 may be cooled.

When the fermentation tank 112 is cooled, the evaporator 134 may cool the fermentation container 12, and the controller 281A may control the refrigerant cycle device 13 according to the temperature detected by the temperature sensor 16 mounted in the fermentation tank 112.

The controller 281A may control a compressor such that the temperature detected by the temperature sensor 16 is maintained at a set temperature (e.g., 35° C.). More specifically, the controller 281A may turn on the compressor of the refrigerant cycle device 13, when the temperature detected by the temperature sensor 16 exceeds a compressor on temperature (e.g., 35.5° C.). The control module 280 may turn off the compressor when the temperature detected by the temperature sensor 16 is equal to or less than a compressor off temperature (e.g., 34.5

During an additive supply step S500 which will be described below, since the water supply heater 53 is turned off, the temperature of the fermentation container 12 may decrease to be lower than a temperature set in the cooling step S300 by water supplied to the fermentation container 12 along with the additive. For example, until then, the temperature of the fermentation container 12 is maintained at about 35° C. and, when the additive and water are supplied to the fermentation container 12 together, the temperature of the fermentation container 12 may decrease to about 30° C. Accordingly, the set temperature during the cooling step S300 is preferably determined in consideration of temperature decrease.

The controller 281A may maintain the closed state of the exhaust valve 156 during the fermentation tank cooling step S300, air between the outer surface of the fermentation container 12 and the inner wall of the fermentation tank 112 is not discharged to the outside through the exhaust valve 156, and air in the fermentation tank 112 may be rapidly cooled.

Exceptionally, when the temperature of the fermentation container 12 is lower than the set temperature even in a state in which an external temperature is very low and the refrigerant cycle device 13 is turned off, the controller 281A may turn on the heater 14 located below the fermentation tank 112. When the temperature detected by the temperature sensor 16 is less than the heater on temperature, the controller 281A may turn on the heater 14. The control module 280 may turn off the heater when the temperature of the temperature sensor 16 is equal to or greater than the heater off temperature.

Meanwhile, the beverage making step may include an air supply step S400.

More specifically, the beverage maker may perform the air supply step S400 of supplying air to the fermentation container 12 and mixing the liquid malt, when the temperature detected by the temperature sensor 16 is equal to or less than the compressor off temperature at least once after the fermentation tank cooling step S300 starts and the compressor of the refrigerant cycle device 13 is turned on. Alternatively, the beverage maker may perform the air supply step S400 of supplying air to the fermentation container 12 and mixing the liquid malt, when the temperature detected by the temperature sensor 16 is equal to or greater than the heater off temperature at least once after the fermentation tank cooling step S300 starts and the heater 14 is turned on.

The beverage maker may control on and off of the refrigerant cycle device 13 and the heater 14 according to the temperature detected by the temperature sensor 16 during the air supply step S400, and on/off control of the refrigerant cycle device 13 and the heater 14 may continue until the additive supply step S500 is completed.

During the air supply step S400, the controller 281A may turn on the air pump 82 and turn off the bypass valve 35 and the main valve 40. In addition, the controller 281A may turn off the gas discharge valve 73 and the exhaust valve 156, and maintain the closed state of the air supply valve 159 and the ingredient supply valve 310.

While the air pump 82 is turned on, air injected into the air injection channel 81 may flow from the first main channel 41 to the second main channel 42 through the bypass channel 43, and pass through the main valve 40 to flow to the fermentation container 12. Air introduced into the fermentation container 12 may collide with the liquid malt to help to more evenly mix the malt with hot water, and air colliding with the liquid malt may supply oxygen to the liquid malt. That is, stirring and aeration may be performed.

While air is injected into the fermentation container 12, the fermentation container 12 may expand by air injected into the fermentation container 12. Some of air between the outer surface of the fermentation container 12 and the inner wall of the fermentation tank 112 may be pushed by the expanded fermentation container 12 to flow to the air supply channel 154, and may be discharged to the outside through the exhaust valve 156. Therefore, the fermentation container 12 may easily expand, and air of the second main channel 42 may be rapidly introduced into the fermentation container 12 to be mixed with the liquid malt.

The controller 281A may mix air with the liquid malt when the air pump 82 is turned on and during a mixing set time, and may complete the air supply step S400 when the air pump 82 is turned on and the mixing set time has elapsed. When the air supply step S400 is completed, the controller 281A may turn off the air pump 82 and close the bypass valve 35. In addition, the controller 281A may close the gas discharge valve 73 and the exhaust valve 156 when the air supply step S400 is completed.

The beverage making step may include an additive supply step S500.

More specifically, the beverage maker may perform the additive supply step S500 after the air supply step S400.

During the additive supply step S500, a first additive of the first capsule C1, a second additive of the second capsule C2 and a third additive of the third capsule C3 may be supplied to the fermentation container 12. In this case, the first capsule C1 may be mounted in an initial capsule mounting portion 31, the second capsule C2 may be mounted in the intermediate capsule mounting portion 32, and the third capsule C3 may be mounted in the final capsule mounting portion 33.

During the additive supply step S500, the controller 281A may turn on the water supply pump 52 and maintain the water supply heater 53 in the off state. In addition, the controller 281A may maintain the closed state of the bypass valve 35 and open the ingredient supply valve 310 and the main valve 40. In addition, the controller 281A may open the gas discharge valve 73 and the exhaust valve 156.

When the water supply pump 52 is turned on, water of the water tank 51 may pass through the water supply pump 52 and the water supply heater 53 to flow to the first main channel 41, and pass through the ingredient supply valve 310 to flow into the first capsule C1. Water flowing into the first capsule C1 may be mixed with the first additive accommodated in the first capsule C1 and flow into the first connecting channel 311 along with the first additive.

Fluid (a mixture of water and the first additive) introduced into the second capsule C2 through the first connecting channel 311 may be mixed with the second additive accommodated in the second capsule C2, and flow to the second connecting channel 312 along with the second additive.

Fluid (a mixture of water, the first additive and the second additive) introduced into the third capsule C3 through the second connecting channel 312 may be mixed with the third additive accommodated in the third capsule C3, and flow to the second main channel 42 along with the third additive.

Fluid (a mixture of water, the first additive, the second additive and the third additive) flowing to the second main channel 42 may pass through the main valve 40 and flow into the fermentation container 12. Therefore, all the additives contained in the capsules C1, C2 and C3 may be supplied to the fermentation container 12.

When the accumulated flow rate detected by the flow meter 56 reaches an additive supply set flow rate after the additive supply process S500 starts, the controller 281A may complete the additive supply process S500. When the additive supply process S500 is completed, the controller 281A may turn off the water supply pump 52.

The beverage making step may include an ingredient-supplier residual-water removing step S600.

More specifically, when the additive supply step S500 is completed, the ingredient-supplier residual-water removing step S600 of removing residual water in the ingredient supplier 3 may be performed.

During the ingredient-supplier residual-water removing step S600, the controller 281A may turn on the air pump 82 and maintain the closed state of the air supply valve 159. In addition, the controller 281A may perform control to open the ingredient supply valve 310 and the main valve 40. In addition, the controller 281A may perform control to open the gas discharge valve 73 and the exhaust valve 156.

When the air pump 82 is turned on, air injected into the air injection channel 81 may flow to the first main channel 41 and pass through the ingredient supply valve 310 to flow into the first capsule C1. Air flowing into the first capsule C1 may sequentially pass through the first capsule C1, the second capsule C2 and the third capsule C3 to blow out residual water into the second main channel 42. Air flowing to the second main channel 42 may flow into the fermentation container 12 along with residual water.

The additive and residual water remaining in the capsules C1, C2 and C3 may entirely flow into the fermentation container 12.

As residual water and air are injected from the second main channel 42 to the fermentation container 12, the fermentation container 12 may further expand, and some of air between the outer surface of the fermentation container 12 and the inner wall of the fermentation tank 112 may be pushed by the expanded fermentation container 12 to flow to the air supply channel 154 and may be discharged to the outside through the exhaust valve 156. Therefore, the fermentation container 12 may easily expand and air and residual water of the second main channel 42 may rapidly flow into the fermentation container 12.

The controller 281A may turn on the air pump 82 during a residual-water removing set time and complete ingredient-supplier residual-water removing step S600 when residual-water removing set time has elapsed.

When the ingredient-supplier residual-water removing step S600 is completed, the controller 281A may turn off the air pump 82 and close the ingredient supply valve 310 and the main valve 40. In addition, the controller 281A may close the gas discharge valve 73 and the exhaust valve 156.

When the ingredient-supplier residual-water removing step S600 is completed, the controller 281A may display a capsule removal message for removing the capsules C1, C2 and C3 on the display 282, and the user may remove the empty capsules from the ingredient supplier 3.

The beverage making step may include fermentation steps S700.

More specifically, after the ingredient-supplier residual-water removing step S600 is completed, a primary fermentation step S710 and a secondary fermentation step S810 may be sequentially performed.

During the fermentation step S700 of the beverage maker, alcohol and carbon dioxide are simultaneously generated from the beverage ingredients. The fermentation step S700 may include a primary fermentation process S710 of generating alcohol (ethanol) without collecting carbon dioxide and a secondary fermentation process S720 of generating and collecting carbon dioxide after the primary fermentation process S710.

The beverage maker may self-determine end of the fermentation step S700 using pressure detection of the gas pressure sensor 72 and opening/closing of the gas discharge valve 73.

The primary fermentation process may include an open fermentation process of fermenting beverage while discharging the gas of the fermentation container 12 to the outside and a closing fermentation process of fermenting beverage without discharging gas of the fermentation container 12 to the outside.

The open fermentation process of the primary fermentation process refers to a process in which the gas discharge valve 73 is kept open for an open set time, and the closing fermentation process of the primary fermentation process refers to a process which the gas discharge valve 73 is kept closed for a closing set time.

In the primary fermentation process, the open fermentation process may be first performed and then the closing fermentation process may be performed after the open fermentation process. In the primary fermentation process, the open fermentation process and the closing fermentation process may be alternately performed over time.

In the beverage maker, the gas pressure sensor 72 may detect pressure during the primary fermentation process and end of the primary fermentation process may be detected according to the pressure value detected by the pressure sensor 72.

Specifically, when the gas discharge valve 73 is switched from an open state to a closed state, the pressure sensor 72 may detect the pressure of the gas discharge channel 71. In addition, when the closing set time has elapsed after the gas discharge valve 73 is closed, the pressure sensor 72 may detect the pressure of the gas discharge channel 71.

Pressure P1 (hereinafter referred to as first pressure) when the gas discharge valve 73 starts to be closed and pressure P2 (hereinafter referred to as second pressure) when the gas discharge valve 73 is closed for a predetermined time are different and, in this case, the second pressure P2 may be higher than the first pressure P1. When the ingredients of the beverage in the fermentation container 12 have not yet been sufficiently fermented, a difference between the second pressure and the first pressure may be large. In contrast, when the ingredients of the beverage in the fermentation container 12 are sufficiently fermented, a difference between the second pressure and the first pressure is small and, in this case, a degree of fermentation may be high.

The controller 281A may end the primary fermentation process when a change value ($P=P2-P1$ or $P=P1-P2$) of the pressure value detected by the pressure sensor 72 during the closing set time is less than first set pressure.

In this case, in the open fermentation process, the gas of the fermentation container 12 may be accommodated in the space S3 of the storage tank 78 without being discharged to the outside.

Gas collection step S800 of accommodating the gas of the fermentation container 12 in the space S3 of the storage tank 78 will be described later.

The accommodated gas may flow back into the fermentation container 12 to help aging of the made beverage when the fermentation step S700 of the fermentation container 12 ends. In this case, the gas accommodated in the storage tank 78 flowing into the fermentation container 12 may be defined as gas filling step S900, which will be described later.

The controller 281A may perform the secondary fermentation process after the primary fermentation process ends.

The secondary fermentation process refers to a process of additionally fermenting the ingredients of the beverage at an interval of a set time (e.g., 12 hours or 24 hours) while determining whether fermentation ends.

In the secondary fermentation process, the beverage may be fermented while the internal pressure of the fermentation container 12 is maintained in a second set pressure range.

In the secondary fermentation process, the controller 281A may compare the pressure value detected by the gas pressure sensor 72 with second set pressure and maintain the internal pressure of the fermentation container 12 in the second set pressure range while opening and closing the gas discharge channel 73.

In the secondary fermentation process, the gas discharge valve 73 may be opened when the pressure value P detected by the pressure sensor 72 exceeds the second set pressure, and may be closed when the pressure value P detected by the pressure sensor 72 is equal to or less than the second set pressure.

That is, in the secondary fermentation process, the beverage is fermented over time, and the closing fermentation process and the open fermentation process may be repeated based on the opening/closing of the gas discharge valve 73.

When the generated gas is reduced as fermentation continues, the number of open fermentation processes per set time is gradually reduced.

In this case, in the open fermentation process, the gas of the fermentation container 12 may be accommodated in the space S3 of the storage tank 78 without being discharged to the outside.

The set pressure is set lower than target pressure of the fermentation tank and the set pressure is set lower than the target pressure of the fermentation tank by reference pressure.

For example, when the target pressure of the fermentation tank is 1.5 bar, the reference pressure may be any one of 0.045 bar to 0.075 bar, which is within 3% to 5% of the target pressure of the fermentation tank. The controller 281A may count the number of times of opening the gas discharge valve 73, in order to determine the end point of the secondary fermentation process.

The controller 281A may detect end of the secondary fermentation process according to the number of open fermentation processes performed during the set time.

Specifically, the controller 281A may self-determine that the secondary fermentation process has ended when the gas discharge valve 73 is not opened during the set time or the number of times of opening the gas discharge valve 73 is less than a set number.

The controller 281A may determine that the fermentation step S700 has ended, when the secondary fermentation process ends.

As described above, in the open fermentation process, the gas of the fermentation container 12 may be accommodated in the space S3 of the storage tank 78 without being discharged to the outside.

Meanwhile, although the primary fermentation step and the secondary fermentation process are sequentially performed in the fermentation step S700 and the controller 281A determines that the fermentation step S700 has ended when detecting end of the secondary fermentation step, the controller 281A may determine end of the fermentation step S700 by immediately detecting end of the secondary fermentation step without detecting or determining end of the primary fermentation step. It should be understood that the determination of end of the fermentation step S700 described below may include both the above cases.

The beverage maker may perform gas collection step S800 of collecting the gas generated by the fermentation module 1 during the fermentation step S700.

Specifically, the gas collection step S800 may mean that the gas generated by fermentation of the ingredients of the beverage by the fermentation module 1 is stored in the storage tank 78 provided with the space S3 capable of being accommodating gas therein without being discharged to the outside.

In this case, the gas generated in the space S3 of the fermentation container 12 may flow to the storage tank 78 through the gas discharge channel 71.

The gas collection step S800 may be performed when the fermentation step S700 is performed or may be performed at a certain time after the fermentation step S700 is performed. In addition, the gas collection step S800 may end when the fermentation step S700 ends or end during the fermentation step S700 when gas is sufficiently collected.

Start and end of the gas collection step S800 will be described below in detail with reference to FIGS. 4 to 6.

The beverage maker may perform the gas filling step S900 of moving the gas accommodated in the storage tank 78 to the fermentation module 1 through the gas discharge channel 71, when the fermentation step S700 ends.

Specifically, the controller 281A may operate the actuator 79 to move the gas accommodated in the storage tank 78 to the fermentation container 12 through the gas discharge channel 71, when the fermentation step S700 ends. The gas moved to the fermentation container 12 may help aging of the beverage in the aging step S1000 after being subjected to a carbonic acid saturation process.

Meanwhile, the gas collected in the space S3 of the storage tank 78 during the fermentation step S700 is one of main factors that determine the taste of the beverage and determine the amount of carbonic acid when making the beverage.

An existing beverage maker used some of the gas generated during beverage fermentation, by receiving gas necessary to make the beverage through an external gas filling device or controlling the pressure inside the fermentation tank 1. Therefore, the separate external gas filling device was required or the fermentation period was increased in order to collect some of the gas generated during beverage fermentation in the fermentation tank 1.

In the present disclosure, by collecting the gas generated in the fermentation step S700 in the storage tank 78 and reusing the gas collected in the storage tank 78 when the beverage is made later, it is possible to shorten a fermentation time.

The beverage making step may include an aging step S1000.

More specifically, when the gas filling step S900 is completed, the aging step S1000 may be performed.

The controller 281A may wait for an aging time during the aging step and control the refrigerant cycle device 13 and the heater 14 such that the temperature of beverage during the aging time is maintained between an upper limit of a set aging temperature and a lower limit of the set aging temperature.

Since the beverage maker is mainly used indoors, the external temperature of the beverage maker is generally between the upper limit of the set aging temperature and the lower limit of the set aging temperature or higher than the upper limit of the set aging temperature. In this case, the controller 281A may turn off the compressor of the refrigerant cycle device 13 when the temperature detected by the temperature sensor 16 is equal to or less than the lower limit of the set aging temperature and turn on the compressor when the temperature detected by the temperature sensor 16 is equal to or greater than the upper limit of the set aging temperature.

Exceptionally, when the external temperature of the beverage maker is less than the lower limit of the set aging temperature, the controller 281A may turn on the heater 14 if the temperature detected by the temperature sensor 16 is less than the lower limit, and may turn off the heater 14 if the temperature detected by the temperature sensor 16 is equal to or greater than the upper limit of the set aging temperature.

The beverage maker may completely make the beverage when the aging time has elapsed.

However, in some cases, the aging step S900 may be omitted, and, when the secondary fermentation step S700 is completed, the beverage may be completely made.

The controller 281A may display completion of making of the beverage through the display 282.

In addition, the controller 281A may control the compressor 34 such that the temperature of the fermentation tank 112 is maintained between the upper limit and lower limit of a preset drinking temperature. The controller 281A may turn on the compressor of the refrigerant cycle device 13 when the temperature detected by the temperature sensor 16 is equal to or greater than the upper limit of the drinking temperature and turn off the compressor when the temperature detected by the temperature sensor 16 is less than the lower limit of the drinking temperature. Therefore, the beverage maker may always provide a cool beverage to the user.

The controller 281A may maintain the temperature of the fermentation tank 112 between the upper limit and lower limit of the preset drinking temperature until the beverage dispensing step S1100 is completed.

The beverage maker according to an embodiment of the present disclosure may further include a beverage dispensing step S1100 of dispensing the beverage after the beverage is completely made.

According to an example of the beverage dispensing step S1000, the beverage dispensing step S1100 may include a beverage dispensing process and a dispenser cleaning process.

During the beverage dispensing step S1100, the user may dispense the beverage by manipulating the dispenser 62.

After the beverage is completely made, when the user opens the dispenser 62, the controller 281A may open the main valve 40 and the beverage dispensing channel 64.

When the main valve 40 and the beverage dispensing channel 64 are opened, the beverage in the fermentation container 12 may flow from the fermentation container 12 to the second main channel 42 by the pressure of air between the outer surface of the fermentation container 12 and the inner wall of the fermentation tank 112 and flow from the second main channel 42 to the beverage dispensing channel 61, thereby being dispensed through the dispenser 62.

When the user dispenses some of the beverage through the dispenser 62 and then closes the dispenser 62, the controller 281A may close the main valve 40 and the beverage dispensing channel 64. Therefore, one beverage dispensing process may be completed.

Thereafter, the controller 281A may turn on the air pump 82, open the air supply valve 159, and maintain the closed state of the exhaust valve 156.

When the air pump 82 is turned on, air injected into the air injection channel 81 may flow from the first main channel 41 to the air supply channel 154, thereby being supplied between the outer surface of the fermentation container 12 and the inner wall of the fermentation tank 112. Air between the outer surface of the fermentation container 12 and the inner wall of the fermentation tank 112 may pressurize the fermentation container 12 with pressure that allows the beverage of the fermentation container 12 to rise to the second main channel 42. This is to enable pressure between the outer surface of the fermentation container 12 and the inner wall of the fermentation tank 112 to be sufficiently high, such that the beverage of the fermentation container 12 is smoothly and rapidly dispensed when the beverage is dispensed later.

The user may dispense the beverage at least once through the dispenser 62. That is, the beverage dispensing process may be performed at least once, and the controller 281A may determine whether the beverage is completely dispensed using information such as a time when the dispenser 62 is opened, a time when the air pump 152 is driven and a time when the main valve 40 is turned on after the beverage is completely made.

The controller 281A may close the air supply valve 159 when the beverage is completely dispensed. In addition, the controller 281A may open the exhaust valve 156 during a completion set time, when the beverage is completely dispensed and the dispenser 62 is in the closed state.

When control is performed to open the exhaust valve 156, air between the outer surface of the fermentation container 12 and the inner wall of the fermentation tank 112 may be discharged to the exhaust valve 156 through the air supply channel 154 and the exhaust channel 157, and the pressure of the space between the outer surface of the fermentation container 12 and the inner wall of the fermentation tank 112 may be equal to atmospheric pressure.

The controller 281A may close the exhaust valve 156, when the completion set time has elapsed after the exhaust valve 156 is turned on.

When the cleaning step S1200 is not performed after the beverage is completely dispensed or when the cleaning step S1200 does not include a main channel washing process which will be described later, the controller 281A may display a pack removal message prompting to remove the fermentation container 12 on the display 282. The user may open the fermentation lid 107 to take the fermentation container 12 out of the fermentation tank module 111.

When the fermentation lid 107 is opened, if the internal pressure of the fermentation tank 112 is equal to or greater than the atmospheric pressure by set pressure or more, the fermentation container 12 may bounce to the upper portion of the fermentation tank 112 by the pressure difference.

In contrast, before the user opens the fermentation lid 107, if some of air between the fermentation container 12 and the fermentation tank 112 is discharged through the exhaust valve 156, the fermentation container 12 does not bounce upward and is kept inside the fermentation tank 112, when the fermentation lid 107 is opened.

That is, the user may safely and cleanly take the used fermentation container 12 out of the fermentation tank 112.

Meanwhile, the dispenser cleaning process may be performed after at least one beverage dispensing process.

If there is a significant time interval from a last beverage dispensing process to a next beverage dispensing process, the inside of the dispenser 62 may be contaminated by the beverage remaining in the dispenser 62.

Accordingly, when the user attempts to dispense the beverage after a dispenser cleaning set time has elapsed from the last beverage dispensing process, the controller 281A may perform the dispenser cleaning process.

More specifically, the controller 281A may start a timer (not shown) when each beverage dispensing process is completed and reset the timer when a next beverage dispensing process starts. The controller 281A may perform the dispenser cleaning process when the timer exceeds the dispenser cleaning set time and the dispenser 62 is opened.

In addition, the controller 281A may perform the dispenser cleaning process by receiving a dispenser cleaning command from the input unit or the mobile terminal.

When the dispenser cleaning process starts, the controller 281A may display a cleaning notification on the display 282. The cleaning notification may include content instructing the user not to bring a cup to the dispenser 62.

An example of the dispenser cleaning process may include a water washing process and an air washing process.

During the water washing process, the controller 281A may turn on the water supply pump 52. In addition, the controller 281A may open the sub valve 92 and the beverage dispensing channel 64 and maintain the closed state of the ingredient supply valve 310 and the bypass valve 35.

When the water supply pump 52 is turned on, water sucked from the water tank 51 to the water supply pump 52 may flow from the water supply channel 55B to the sub channel 91, pass through the sub valve 92 to flow to the beverage dispensing channel 61, and pass through the beverage dispensing channel 64, thereby being dispensed through the dispenser 62. While water is dispensed through the dispenser 62, cleaning may be performed by taking residue and foreign materials out of the dispenser 62.

Water and foreign materials taken out through the dispenser 62 may be dropped to the beverage container 101.

When the quantity of accumulated water of the flow meter 56 reaches a water washing set quantity after the water washing process starts, the controller 281A may complete the water washing process. In this case, the water washing set quantity may be less than a cleaning set quantity in the cleaning steps S100 and S1200.

The controller 281A may turn off the water supply pump when the water washing process is completed. In addition, the controller 281A may start the air washing process when the water washing process is completed.

The controller 281A may turn on the air pump 82 when the air washing process starts.

When the air pump 82 is turned on, air injected from the air pump 82 to the first main channel 41 through the air injection channel 81 may pass through the water supply heater 53 to flow to the sub channel 91, pass through the sub valve 92 to flow to the beverage dispensing channel 61, and pass through the beverage dispensing channel 64, thereby being discharged through the dispenser 62. In the process of discharging air through the dispenser 62, cleaning may be performed by dispensing air along with residual water remaining in the dispenser 62. Therefore, it is possible to minimize influence of residual water on the taste of the beverage in the beverage dispensing process.

The controller 281A may complete the air washing process when an air washing set time has elapsed after the air washing process. When the air washing process is completed, the controller 281A may turn off the air pump 82 and close the sub valve 92. Therefore, the dispenser cleaning process may be completed.

The controller 281A may start the beverage dispensing process again when the dispenser cleaning process is completed.

Meanwhile, when the entire beverage of the fermentation container 12 is dispensed and the controller 281A determines that the beverage is completely dispensed, the controller 281A may further perform the beverage making step and the cleaning step S1200 after dispensing the beverage.

The beverage making step and the cleaning step S1200 after dispensing the beverage may include at least one of a first cleaning process or a second cleaning process. when the cleaning step S1100 includes the first cleaning process and the second cleaning process, the order of the cleaning processes may not be limited.

The first cleaning process is equal or similar to the cleaning step S100 before the beverage making step and thus a repeated description thereof will be omitted. Hereinafter, the second cleaning process will be described.

The second cleaning process may be performed in a state in which the beverage is completely dispensed and the empty fermentation container 12 is installed, or may be performed after the user removes the empty fermentation container 12 and installs a separate cleaning pack in the fermentation tank 112. Hereinafter, for convenience of description, for example, the case where the separate cleaning pack is accommodated in the fermentation tank 112 will be described.

The controller 281A may display a container replacement notification on the display 282, when the beverage of the fermentation container 12 is completely dispensed. The user may insert the separate cleaning pack into the fermentation tank 112 after opening the fermentation lid and removing the empty fermentation container 12 from the fermentation tank 112. Thereafter, the fermentation lid 107 may be closed.

Thereafter, the controller 281A may start the second cleaning process.

When the second cleaning process starts, the controller 281A may turn on the water supply pump 52 and the water supply heater 53 and close the beverage dispensing channel 64. In addition, the controller 281A may open the ingredient supply valve 310, the bypass valve 35 and the main valve 40.

When the second cleaning process starts, the controller 281A may open the gas discharge valve 73 and the exhaust valve 156. In addition, the controller 281A may open the sub valve 92.

When the water supply pump 52 is turned on, water of the water tank 51 may flow to the water supply heater 53, thereby being heated by the water supply heater 53.

Water (that is, hot water) heated by the water supply heater 53 may divisionally flow to the sub channel 91 and the first main channel 41.

Water flowing to the sub channel 91 may pass through the sub valve 92 to flow to the beverage dispensing channel 61. Water flowing to the beverage dispensing channel 61 may flow to the second main channel 42 and pass through the main valve 40 to flow into the cleaning pack accommodated in the fermentation tank 112.

In addition, water flowing to the first main channel 41 may divisionally flow to the ingredient supplier 3 and the bypass channel 43.

Water flowing to the ingredient supplier 3 may sequentially pass through the ingredient supply valve 310, the initial capsule mounting portion 31, the intermediate capsule mounting portion 32 and the final capsule mounting portion 33 to flow to the second main channel 43 and may pass through the main valve 40 to flow into the cleaning pack accommodated in the fermentation tank 112.

Water flowing to the bypass channel 43 may pass through the bypass valve 35 to flow to the second main channel 43 and pass through the main valve 40 to flow into the cleaning pack accommodated in the fermentation tank 112.

During the control, the main channels 41 and 42, the bypass channel 43, the sub channel 91, the valves installed in each channel and the main channel connecting portion 115 may be sterilized and washed. In addition, the capsule mounting portions 31, 32 and 33 and the connecting channels 311 and 312 may be sterilized and washed.

The controller 281A may perform the above-described cleaning during a second cleaning set time and complete the second cleaning process after the second cleaning set time.

The controller 281A may turn off the water supply pump 52 and the water supply heater 53 after the second cleaning set time has elapsed, and close the main valve 40, the bypass valve 35, the ingredient supply valve 310, the sub valve 92, the gas discharge valve 73 and the exhaust valve 156.

Meanwhile, after the cleaning step S1200 is completed, the user may open the fermentation lid 107 and take out and process the cleaning pack containing water used for washing in the fermentation tank 112.

Figure 4:
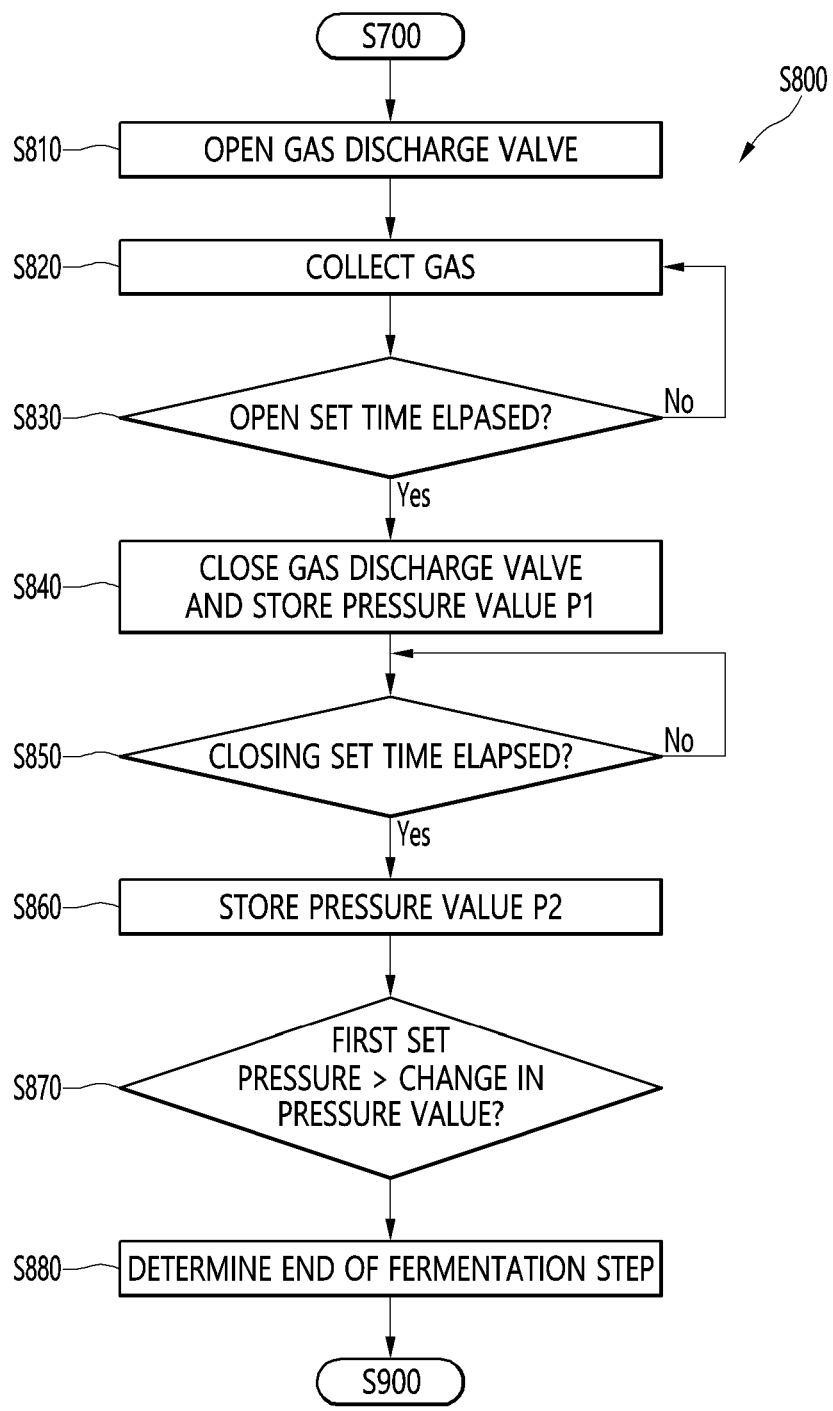
FIG. 4 is a flowchart illustrating a method of controlling a beverage maker according to an embodiment of the present disclosure.
Figure 5:
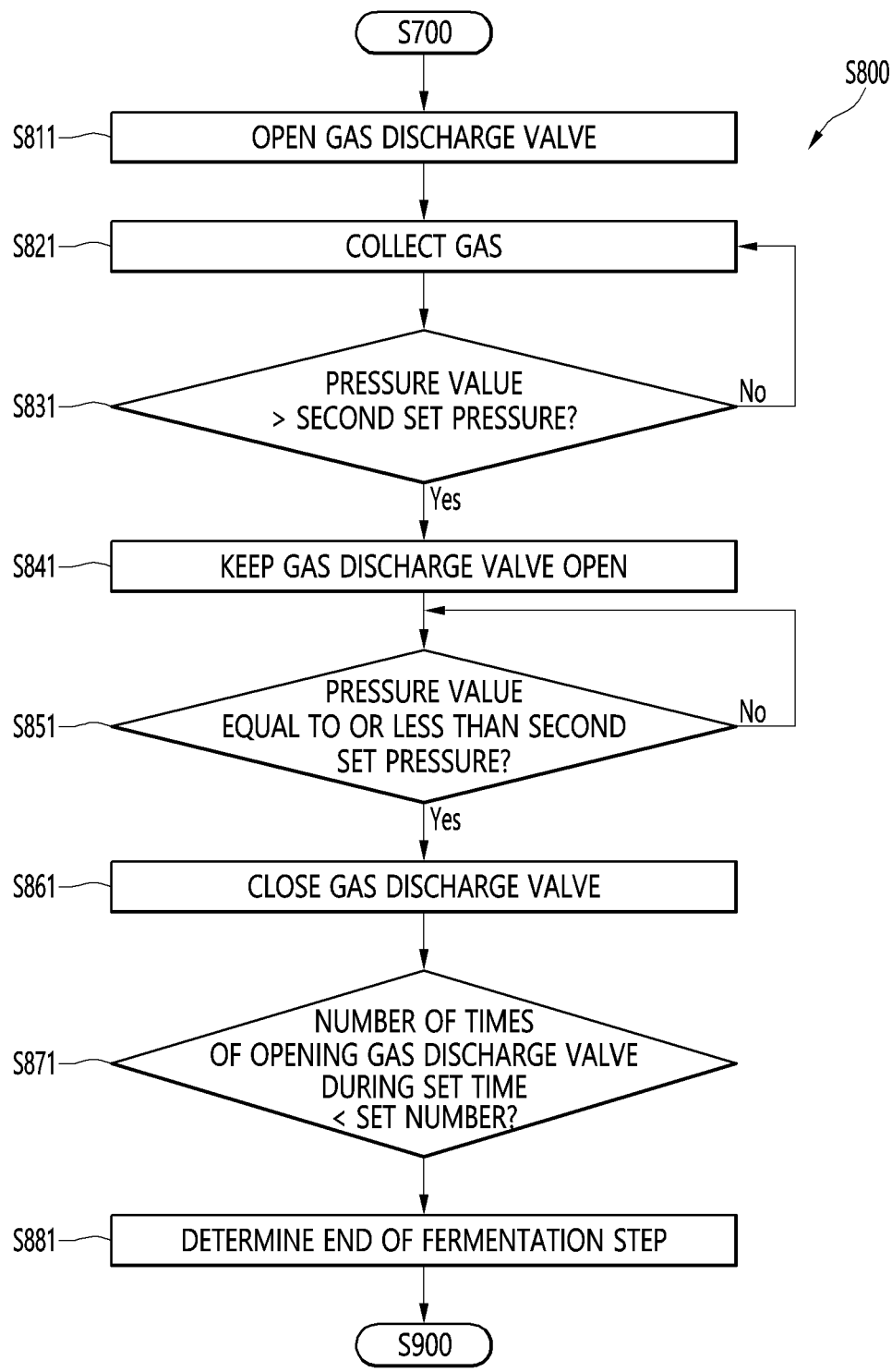
FIG. 5 is a flowchart illustrating a method of controlling a beverage maker according to another embodiment of the present disclosure.
Figure 6:
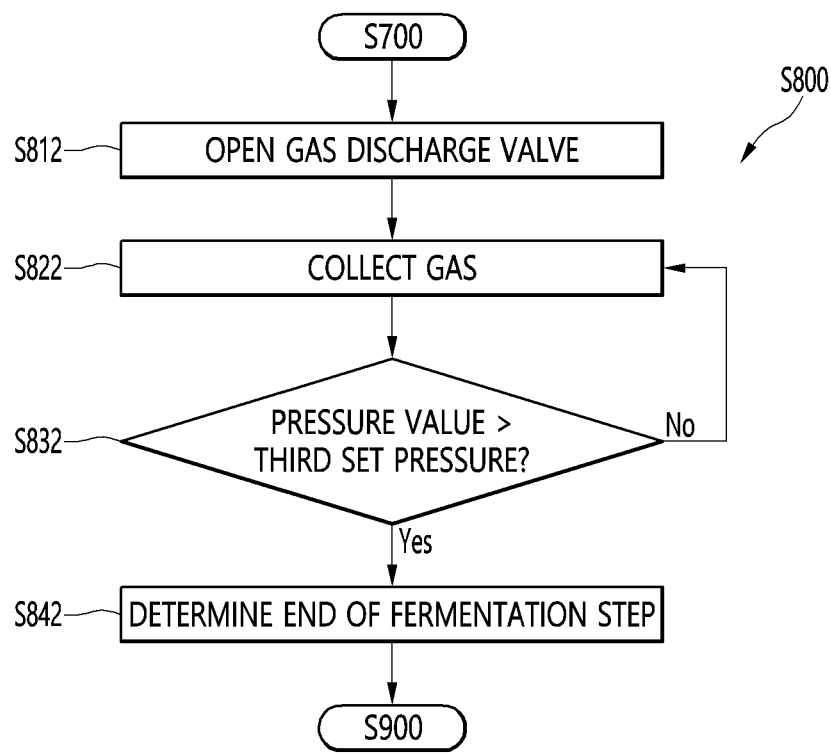
FIG. 6 is a flowchart illustrating a method of controlling a beverage maker according to another embodiment of the present disclosure.

FIGS. 4 to 6 are views illustrating the gas collection step S800 according to various embodiments of the present disclosure.

First, the gas collection step S800 may mean that, when the gas discharge valve 73 is opened during the fermentation step S700, the gas is collected using the storage tank 78 provided with the space S3 capable of being accommodating gas therein.

Hereinafter, various embodiments in which the controller 281A controls the gas discharge valve 73 based on the pressure value detected by the gas pressure sensor 72 and determines the gas collection step S800 of collecting gas and the end of the gas collection step S800 will be described with reference to FIGS. 4 to 6.

FIG. 4 is a flowchart illustrating a first embodiment of the gas collection step S800 of collecting gas during the fermentation step S700 of the present disclosure.

The first embodiment shows the case where the controller 281A determines the end of the fermentation step S700 when the end of the primary fermentation process is detected.

First, the fermentation step S700 may be performed when the residual-water removing step S600 shown in FIG. 3 ends.

The controller 281A may open the gas discharge valve 73 when the fermentation step S700 starts.

When the gas discharge valve 73 is opened, the gas generated in the fermentation module 1 may move to the storage tank 78 through the gas discharge channel 71. Since the storage tank 78 may define the space S3 capable of accommodating gas therein, the gas moved to the storage tank 78 may be collected in the space S3 (S820).

In the fermentation step S700, the gas discharge valve 73 may be closed after being opened during an open set time, and the gas discharge value 73 may be kept closed for a closing set time.

Specifically, the controller 281A may keep the gas discharge valve 73 open for the open set time. The controller 281A may keep the gas discharge valve 73 open until the time measured by a timer reaches the open set time after the gas discharge valve 73 is opened.

The controller 281A may close the gas discharge valve 73 when the time measured by the timer reaches the open set time after the gas discharge valve 73 is opened.

The controller 281A may store a first pressure value P1 detected by the pressure sensor 72 in the data storage 290 when the gas discharge valve 73 is closed.

The controller 281A may keep the gas discharge valve 73 close for the closing set time after closing the gas discharge valve 73.

Specifically, the controller 281A may keep the gas discharge valve 73 close until the time measured by the timer reaches the close set time after the gas discharge valve 73 is closed.

The controller 281A may store a second pressure value P2 detected by the pressure sensor 72 in the data storage 290 (S860), when the time measured by the timer reaches the closing set time after closing the gas discharge valve 73.

The controller 281A may compare a difference between the first pressure P1 stored in the data storage 290 the second pressure P2 with first set pressure (S870).

Here, the difference P2−P1 or P1−P2 between the first pressure P1 and the second pressure stored in the data storage 290 may be a change P in pressure detected by the pressure sensor 72 during the closing set time.

The controller 281A may determine that the fermentation step S700 has ended (S880) when the pressure change value (P=P2−P1 or P1−P2) is less than the first set pressure and may end the gas collection step S800.

The controller 281A may repeatedly perform the process of FIG. 4 upon determining that the gas collection step S800 has not ended.

The controller 281A may turn off the gas discharge valve 73 in the on state or perform the gas filling step S900, when the fermentation step S700 has ended.

FIG. 5 is a flowchart illustrating a method of controlling a beverage maker according to another embodiment of the present disclosure.

FIG. 5 is a flowchart illustrating a second embodiment of the gas collection step S800 of collecting gas during the fermentation step S700 of the present disclosure.

The second embodiment shows the case where the controller 281A determines end of the fermentation step S700 by detecting end of the secondary fermentation process without determining end of the primary fermentation process, upon determining end of the fermentation step S700.

The controller 281A may open the gas discharge valve 73 (S811) when the fermentation step S700 starts.

When the gas discharge valve 73 is opened, the gas generated in the fermentation module 1 may move to the storage tank 78 through the gas discharge channel 71. Since the storage tank 78 defines the space S3 capable of accommodating gas therein, the gas moved to the storage tank 78 may be collected in the space S3 (S821).

The controller 281A may compare the pressure detected by the pressure sensor 72 with second set pressure (S831).

The controller 281A may keep the gas discharge valve 73 open, when the pressure value P obtained by the pressure sensor 72 exceeds the second set pressure.

The controller 281A may close the gas discharge valve 73 (S851 and S861), when the pressure value P obtained by the pressure sensor 72 is equal to or less than the second set pressure.

Specifically, the controller 281A may open or close the gas discharge valve 73 while comparing the pressure detected by the pressure sensor 72 with the second set pressure, until a time elapsed after the fermentation step S700 starts reaches a set time.

In addition, the controller 281A may accumulate the number of times of opening the gas discharge valve 73 during the set time.

The controller 281A may compare the accumulated number of times of opening the gas discharge valve 73 with a set number (S871), when the set time is reached after fermentation starts.

The controller 281A may determine that the fermentation step S700 has ended when the number of times of opening the gas discharge valve 73 is less than the set number during the set time.

The controller 281A may end the gas collection step S800 and perform the gas filling step S900, upon determining that the fermentation step S700 has ended.

For example, when the set time is set to 12 hours, end of the fermentation step S700 may be determined according to the number of times of opening the gas discharge valve 73 for 12 hours.

In addition, the set number of times may be set to a particular number such as one, two or three.

When the set number is set to 1, the fermentation step S700 may end if the gas discharge valve 73 is not opened for a set time.

As fermentation of the beverage has gradually ended, the change in pressure detected by the pressure sensor 72 is gradually reduced. Accordingly, the controller 281A may determine the end of the fermentation step S700 and end gas collection, when the number of times of opening the gas discharge valve 73 is less than the set number during the set time after determining whether fermentation has ended at least once.

Meanwhile, the controller 281A may repeatedly perform the process of FIG. 5 upon determining that the gas collection step S800 has not ended.

Specifically, in the fermentation step S700, if the number of times of opening the gas discharge valve 73 is equal to or greater than the set number during the set time, as shown in FIG. 5, the gas discharge valve 73 may be repeatedly opened or closed according to the pressure value P of the pressure sensor 72.

Meanwhile, the controller 281A may determine the end of the fermentation step S700 described with reference to FIG. 4 as the end of the primary fermentation process to maintain the gas collection step S800, determine the end of the fermentation step S700 described with reference to FIG. 5 as the end of the secondary fermentation process, and finally determine the end of the secondary fermentation process as the end of the fermentation step, thereby ending the gas collection step S800.

FIG. 6 is a flowchart illustrating a method of controlling a beverage maker according to another embodiment of the present disclosure.

FIG. 6 is a flowchart illustrating a third embodiment of the gas collection step S800 of collecting gas during the fermentation step S700 of the present disclosure.

The controller 281A may open the gas discharge valve 73 (S811) when the fermentation step S700 starts.

When the gas discharge valve 73 is opened, the gas generated in the fermentation module 1 may move to the storage tank 78 through the gas discharge channel 71. Since the storage tank 78 defines the space S3 capable of accommodating gas therein, the gas moved to the storage tank 78 may be collected in the space S3 (S822).

When the gas discharge valve is opened during the fermentation step S700, the total pressure of the fermentation module 1, the gas discharge channel 71 and the storage tank 78 may increase according to the fermentation of the beverage.

The controller 281A may determine the end of the fermentation step when the pressure value measured by the pressure sensor 72 exceeds third set pressure and end the gas collection step S800, after the fermentation step S700 starts.

Meanwhile, when the amount of gas accommodated in the space S3 of the storage tank 78 exceeds a certain reference value in the gas collection step S800, the gas collection step S800 may end during the fermentation step S700.

Although the controller 281A determines that the gas collection step S800 has ended, upon determining that the fermentation step S700 is performed, the gas discharge valve 73 is kept closed and the safety valve 75 may limit the maximum internal pressure of the fermentation container 12 and the gas discharge channel 71.

The beverage maker of the present disclosure may perform the gas filling step S900 of filling the space S3 of the fermentation container 12 with gas and complete beverage making through the aging step S1000.

Figure 7:
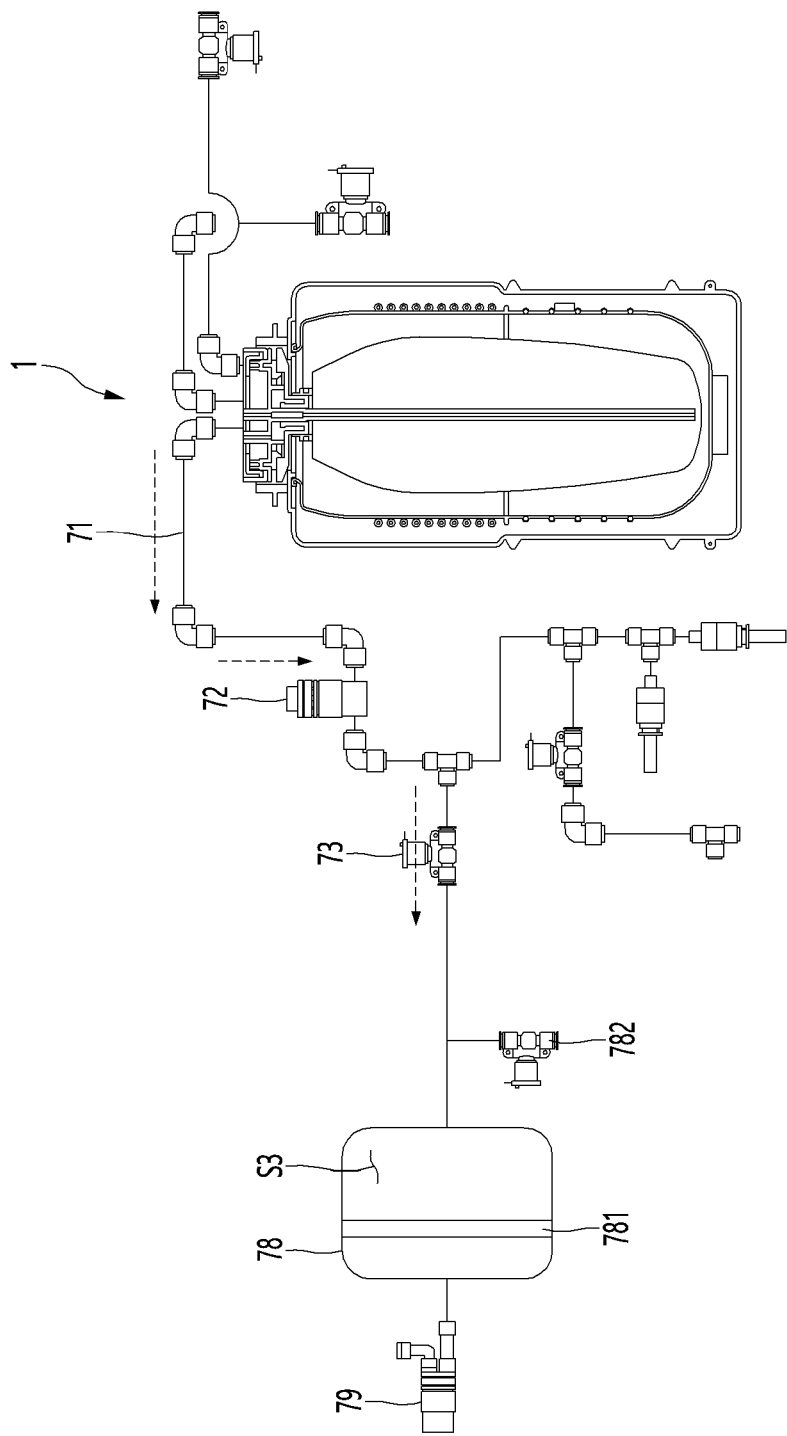
FIG. 7 is a view illustrating the configuration of a beverage maker with operation of the beverage maker according to an embodiment of the present disclosure.

FIG. 7 is a view illustrating the configuration of a beverage maker with operation of the beverage maker according to an embodiment of the present disclosure.

FIG. 7 is a view illustrating operation of the gas collection step S800 of the present disclosure.

Referring to FIG. 7, in the fermentation step S700, the internal pressure of the fermentation container 12 starts to increase, the gas discharge valve 73 may be opened to release the internal pressure of the fermentation container 12.

When the gas discharge valve 73 is opened, the gas of the fermentation container 12 flows along the gas discharge channel 71 to pass through the gas discharge valve 73 and flows into the space S3 of the storage tank 78.

The gas introduced into the space S3 of the storage tank 78 may be stored in the storage tank 78 in the gas filling step S800.

According to the gas introduced into the space S3 of the storage tank 78, a partition wall 781 disposed inside the storage tank 78 to partition the storage tank 78 may move in a gas introduction direction, thereby widening the space S3 in which the gas is collected.

Figure 8:
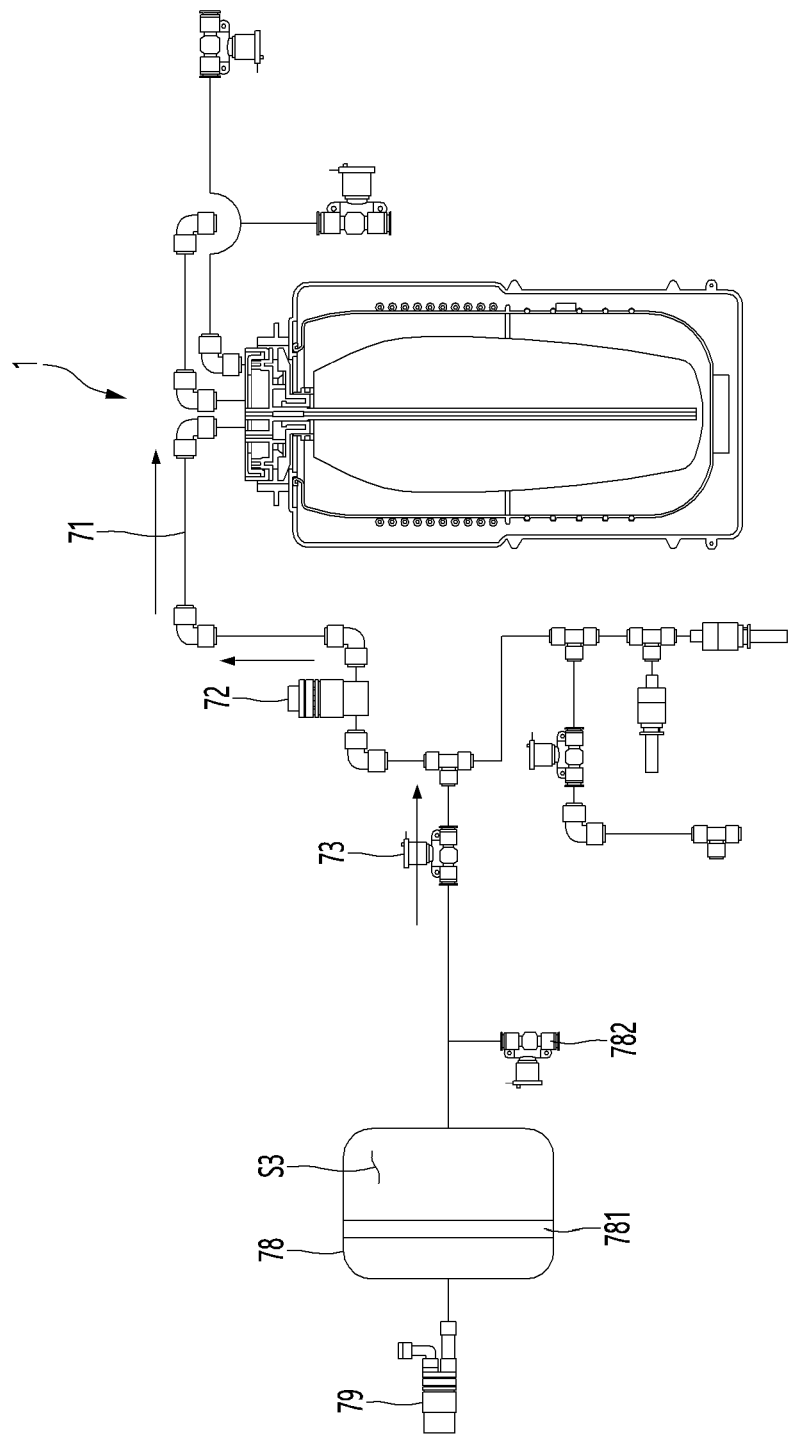
FIG. 8 is a view illustrating the configuration of a beverage maker with operation of the beverage maker according to an embodiment of the present disclosure.

FIG. 8 is a view illustrating the configuration of a beverage maker with operation of the beverage maker according to an embodiment of the present disclosure.

FIG. 8 is a view illustrating operation of the gas filling step S900 of the present disclosure.

Referring to FIG. 8, when the fermentation step S700 has ended, the controller 281A may keep the gas discharge valve 73 open, in order to move the gas accommodated in the space S3 of the storage tank 78 into the fermentation container 12.

The controller may operate the actuator 79 to move the partition wall 781 disposed inside the storage tank 78 in a direction in which the volume of the space S3 is reduced. The gas collected in the space S3 of the storage tank 78 according to the movement of the partition wall 781 may be introduced into the gas discharge channel 71 through the gas discharge valve 73 and the gas introduced into the gas discharge channel may be introduced into the fermentation module 1.

The gas introduced into the fermentation module 1 may help aging of the beverage in the fermentation container 12.

Meanwhile, the fermentation module 1 is filled with necessary gas (the inside of the fermentation container is saturated), the controller 281A may open the gas release valve 782 in order to discharge the gas accommodated in the space S3 of the storage tank 78 to the outside, after operation of the actuator 79 ends and the gas discharge valve 73 is closed.

Alternatively, the controller 281A may open the gas release valve 782 after maintaining operation of the actuator 79 and closing the gas discharge valve 73, thereby efficiently removing the gas remaining in the storage tank 78.

To this end, the gas release valve 782 may be disposed in the storage tank 78 or in a channel between the storage tank 78 and the gas discharge valve 73.

The gas generated according to the fermentation of the beverage in the fermentation container 12 may be stored in the storage tank 78 and the stored gas may be supplied to the fermentation container 12 later to be used in the aging step S1000 to provide gas required for the aging step S1000 in the beverage making process requiring the fermented gas, thereby improving the taste and maintaining the sense of unity of the taste as compared to the case of using a separate gas supply device.

According to the present disclosure, by accommodating the gas generated when making the beverage in the space of the storage tank and filling the fermentation module with the gas accommodated in the storage tank, it is possible to shorten a time required for the fermentation step and to finally shorten a beverage making time.

According to the present disclosure, the actuator can efficiently fill the fermentation module with gas using the partition wall disposed inside the storage tank.

According to the present disclosure, since gas generated in the fermentation step is collected to fill the fermentation module again, it is possible to maintain the sense of unity in the beverage making process.

According to the present disclosure, since a gas release valve accommodated in the space of the storage tank to discharge gas to the outside is provided, it is possible to efficiently remove gas remaining after filling the fermentation module.

The above description is merely illustrative of the technical idea of the present disclosure, and those of ordinary skill in the art to which the present disclosure pertains will be able to make various modifications and variations without departing from the essential characteristics of the present disclosure.

Accordingly, the embodiments disclosed in the present disclosure are not intended to limit the technical idea of the present disclosure, but to explain the technical idea, and the scope of the technical idea of the present disclosure is not limited by these embodiments.

The scope of the present disclosure should be interpreted by the following claims, and all technical ideas within the scope equivalent thereto should be construed as being included in the scope of the present disclosure.

What is claimed is:

1. A beverage maker comprising:
   a fermentation module;
   a gas discharge channel connected to the fermentation module;
   a gas discharge valve connected to the gas discharge channel;
   a storage tank connected to the gas discharge valve and provided with a space capable of accommodating gas therein;
   an actuator configured to inject gas collected in the space of the storage tank to the fermentation module through the gas discharge channel;
   a gas pressure sensor connected before the gas discharge valve in a gas flow direction in the gas discharge channel; and
   a controller configured to control the gas discharge valve and the actuator based on a pressure value of the gas pressure sensor.

2. The beverage maker of claim 1, wherein the controller is configured to open the gas discharge valve such that gas generated in the fermentation module is accommodated in the storage tank along the gas discharge channel, during a fermentation step.

3. The beverage maker of claim 2, wherein the controller is configured to:
   close the gas discharge valve after opening the gas discharge valve for an open set time and close the gas discharge valve during a closing set time, and
   determine whether the fermentation step has ended when change in pressure value detected by the pressure sensor is less than first set pressure during the closing set time.

4. The beverage maker of claim 2, wherein the controller is configured to:
   open the gas discharge valve when a pressure value obtained by the pressure sensor exceeds a second set pressure, and close the gas discharge valve when the pressure value obtained by the pressure sensor is equal to or less than the second set pressure, and
   determine that the fermentation step has ended when a number of times the gas discharge valve is opened is less than a set number during a set time.

5. The beverage maker of claim 2, wherein the controller is configured to open the gas discharge valve and to determine that the fermentation step has ended when a pressure value obtained by the pressure sensor exceeds a third set pressure.

6. The beverage maker of claim 1, wherein the controller is configured to operate the actuator to move gas accommodated in the storage tank to the fermentation module through the gas discharge channel, when a fermentation step has ended.

7. The beverage maker of claim 1, further comprising a partition wall disposed inside the storage tank to partition the storage tank.

8. The beverage maker of claim 1, further comprising a gas release valve configured to discharge gas accommodated in the space of the storage tank to an outside.

9. A method of operating a beverage maker, the method comprising:
   a fermentation step of detecting pressure by a pressure sensor provided in a gas discharge channel, through which gas of a fermentation module is discharged, and opening or closing a gas discharge valve connected to the gas discharge channel based on the pressure detected by the pressure sensor;
   a gas collection step of collecting gas using a storage tank connected to the gas discharge valve and provided with a space capable of accommodating gas therein when the gas discharge valve is opened, during the fermentation step; and
   a gas filling step of transmitting gas collected using an actuator connected to the storage tank to the fermentation module in a gas collection direction, when the fermentation step has ended.

10. The method of claim 9, wherein the gas collection step comprises:
    closing the gas discharge valve after opening the gas discharge valve for an open set time and closing the gas discharge valve during a closing set time; and
    determining that the fermentation step has ended when change in pressure value detected by the pressure sensor during the closing set time is less than first set pressure.

11. The method of claim 9, wherein the gas collection step comprises:
    opening the gas discharge valve when a pressure value obtained by the pressure sensor exceeds a second set pressure and closing the gas discharge valve when the pressure value obtained by the pressure sensor is equal to or less than the second set pressure, and
    determining that the fermentation step has ended when a number of times the gas discharge valve is opened during a set time is less than a set number.

12. The method of claim 9, wherein the gas collecting step comprises opening the gas discharge valve and determining that the fermentation step has ended when a pressure value obtained by the pressure sensor exceeds a third set pressure.

13. The method of claim 9, further comprising a partition wall disposed inside the storage tank to partition the storage tank.

14. The method of claim 9, further comprising a gas release valve discharging gas accommodated in the space to an outside after the gas filling step.

* * * * *